(12) United States Patent
Manabe et al.

(10) Patent No.: US 6,411,355 B1
(45) Date of Patent: Jun. 25, 2002

(54) LIQUID CRYSTAL DISPLAY DEVICE WITH COMPENSATION FOR VIEWING ANGLE DEPENDENCY AND OPTICAL ANISOTROPIC ELEMENT USED THEREIN

(75) Inventors: Atsuyuki Manabe; Masahito Ishikawa; Yasuharu Tanaka; Hitoshi Hatoh; Masumi Okamoto, all of Kanagawa-ken (JP)

(73) Assignee: Toshiba Techno Center Inc., Kawasaki (JP)

(*) Notice: Subject to any disclaimer, the term of this patent is extended or adjusted under 35 U.S.C. 154(b) by 0 days.

(21) Appl. No.: 08/698,997

(22) Filed: Aug. 16, 1996

(30) Foreign Application Priority Data

Aug. 17, 1995 (JP) ............................................. 7-209562
Nov. 24, 1995 (JP) ............................................. 7-305879

(51) Int. Cl.$^7$ .............................................. G02F 1/1335
(52) U.S. Cl. ...................................... 349/120; 349/119
(58) Field of Search ................................ 349/117, 119, 349/120

(56) References Cited

U.S. PATENT DOCUMENTS

| | | | | |
|---|---|---|---|---|
| 5,126,866 A | * | 6/1992 | Yoshimizu et al. | 349/119 |
| 5,166,817 A | * | 11/1992 | Ota et al. | 349/119 |
| 5,184,237 A | * | 2/1993 | Iimura et al. | 349/119 |
| 5,194,975 A | * | 3/1993 | Akatsuka et al. | 349/120 |
| 5,583,679 A | * | 12/1996 | Ito et al. | 349/120 |
| 5,619,352 A | * | 4/1997 | Koch et al. | 349/119 |
| 5,631,755 A | * | 5/1997 | Sakaya et al. | 349/117 |
| 5,677,747 A | * | 10/1997 | Ishikawa et al. | 349/120 |
| 5,706,068 A | * | 1/1998 | Abileah et al. | 349/120 |

FOREIGN PATENT DOCUMENTS

GB    1 462 978    1/1977

* cited by examiner

Primary Examiner—Toan Ton
(74) Attorney, Agent, or Firm—Pillsbury Winthrop LLP

(57) ABSTRACT

In a liquid crystal display device having a driving liquid crystal cell interposed between two polarizers 1 and 4, the cell having a liquid crystal layer 3e held between two substrates 3a and 3b, the layer having a twisted molecular alignment when no voltage is applied, and the liquid crystal cell performing optical control, using the optical anisotropy of liquid crystal, there is provided with an optical anisotropic element 2 between the polarizer and the driving liquid crystal cell, the optical anisotropic element 2 comprising an optical anisotropic substance layer 2c in which the optical rotatory power is minimal in the direction of layer thickness and the optical anisotropy is negative. The angle of the optical axis of the optical anisotropic element 2 varies continuously or in stages in the direction of layer thickness of the optical anisotropic element as against the surface of the optical anisotropic element. Furthermore, optical anisotropic element with negative optical anisotropy can be combine to the anisotropically negative element.

8 Claims, 34 Drawing Sheets

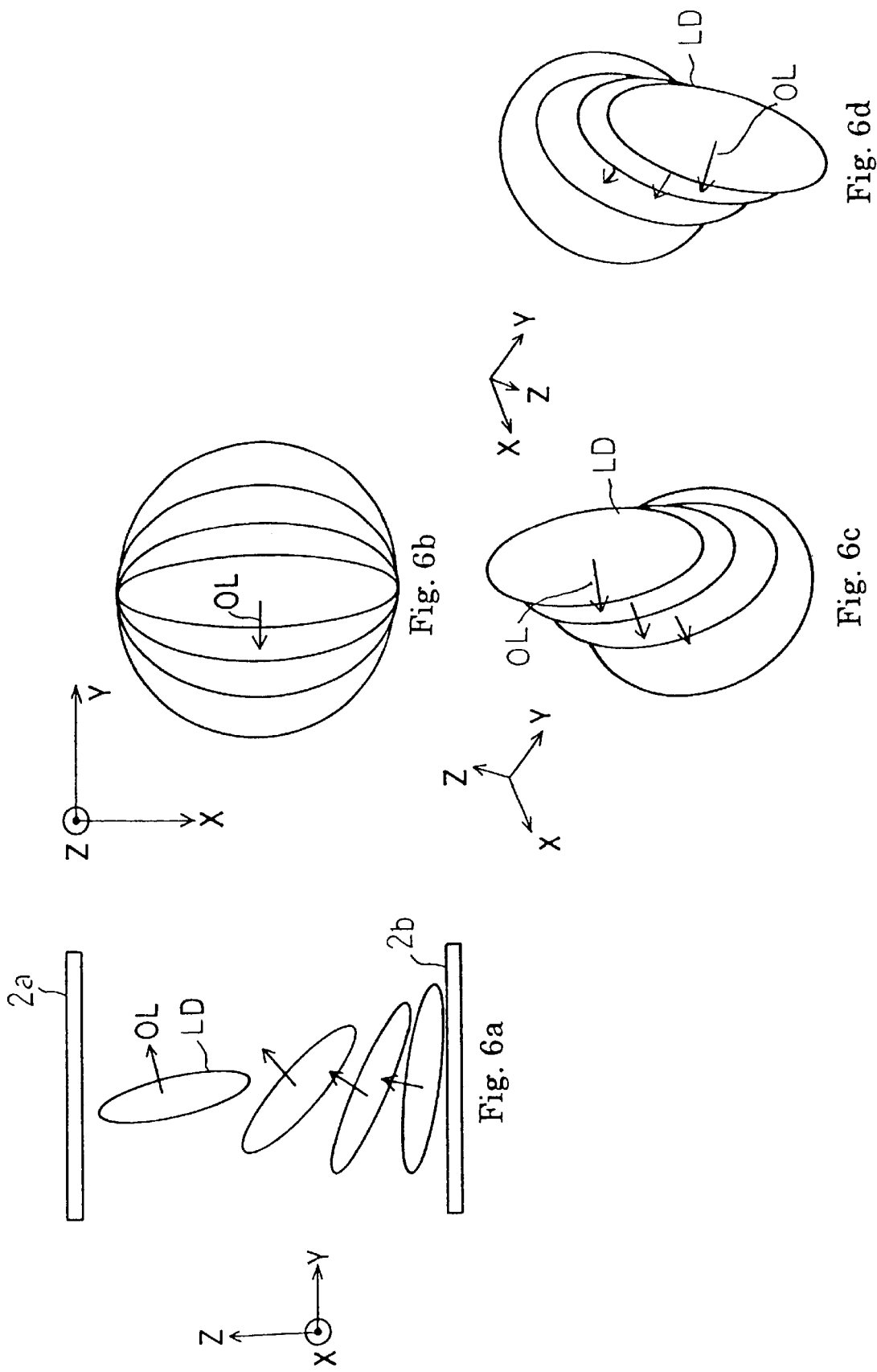

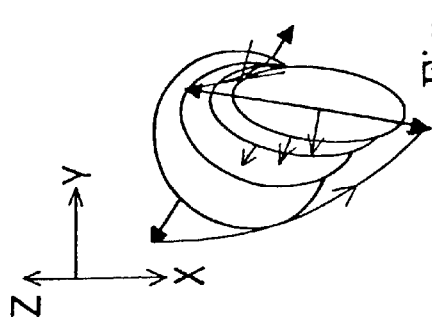
Fig. 7a
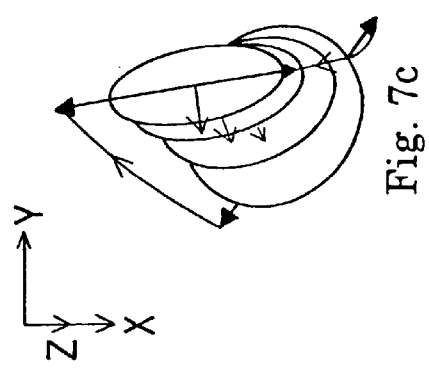
Fig. 7c
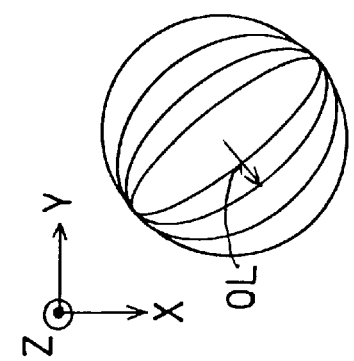
Fig. 7e
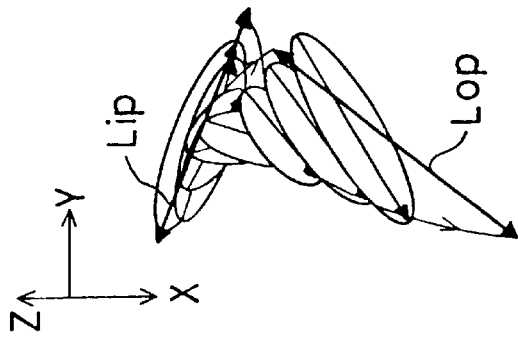
Fig. 7b
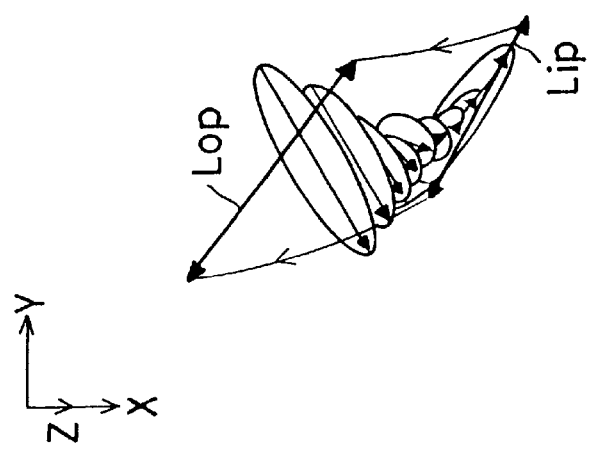
Fig. 7d
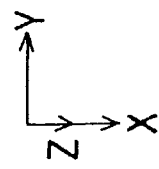
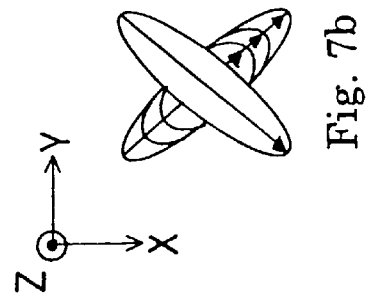
Fig. 7f

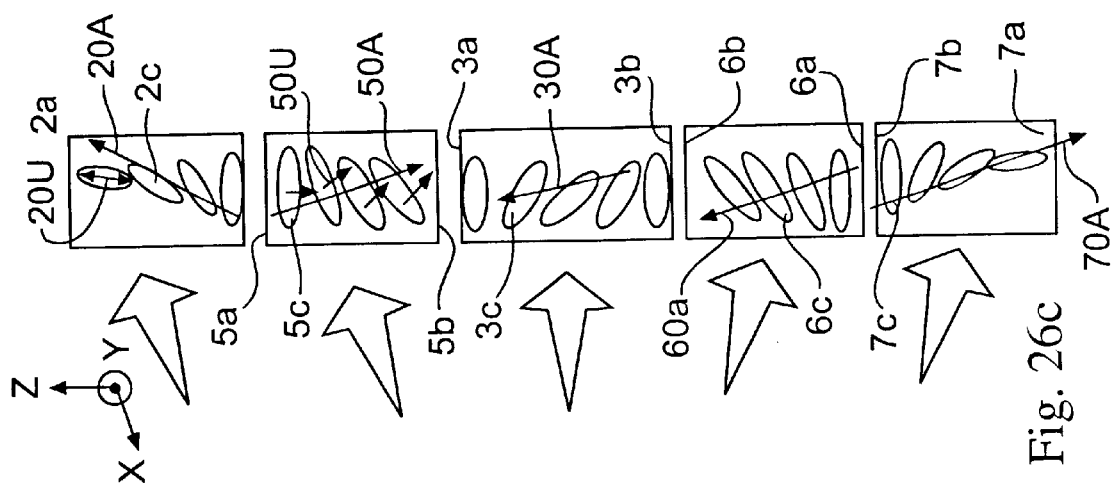
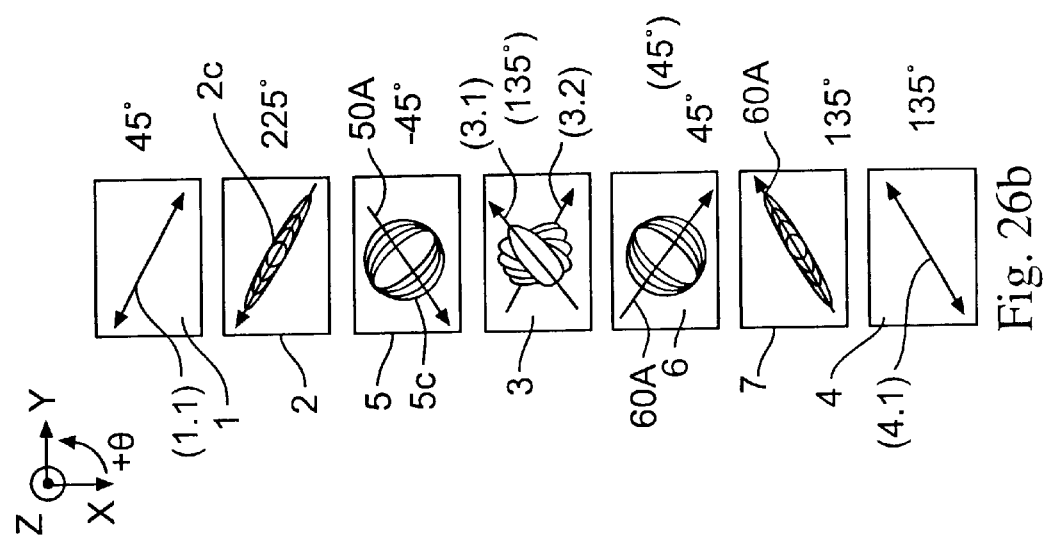
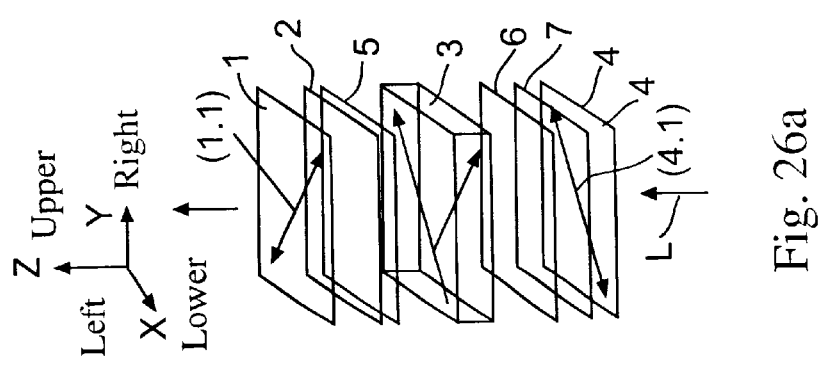
Fig. 26c
Fig. 26b
Fig. 26a

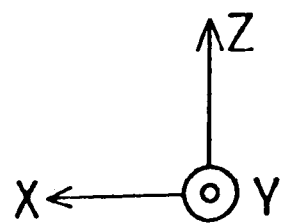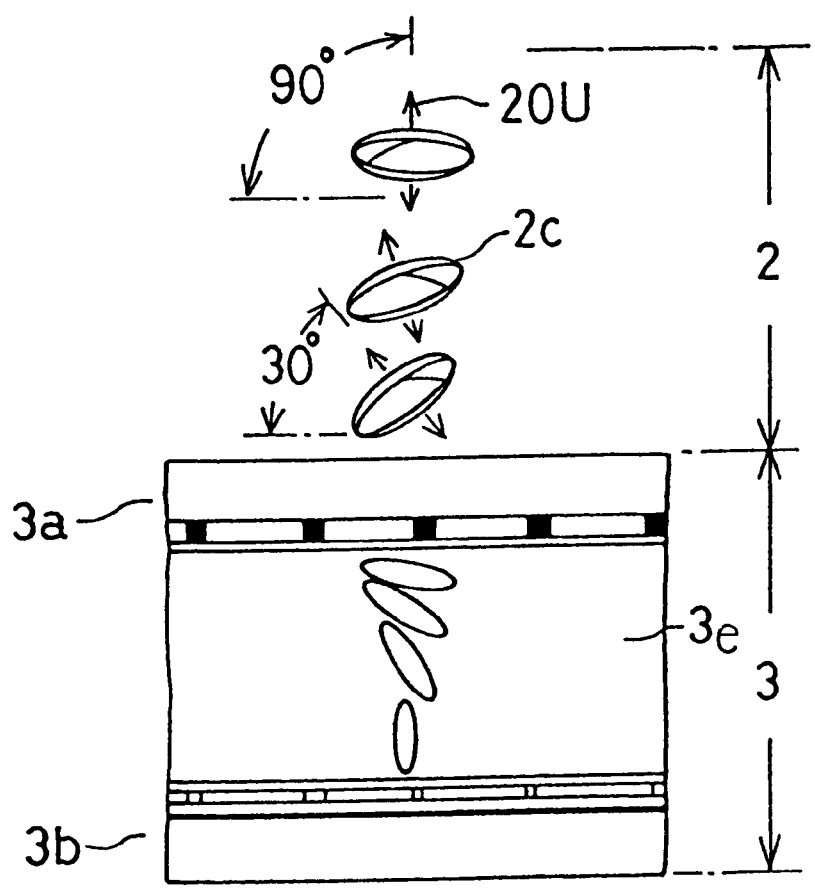
Fig. 33

LIQUID CRYSTAL DISPLAY DEVICE WITH COMPENSATION FOR VIEWING ANGLE DEPENDENCY AND OPTICAL ANISOTROPIC ELEMENT USED THEREIN

BACKGROUND OF THE INVENTION

1. Field of the Invention

This invention relates to a liquid crystal display device and the optical anisotropic element used therein.

2. Description of the Related Art

The liquid crystal display device is not only used as a display unit for wrist watches, electronic calculators, word processors and personal computers thanks to its crucial advantages of being thin and light-weight and of low power consumption, but also widely used in many newly designed products.

The liquid crystal display device used in personal computers, among others, uses larger and larger display units with higher capacity and greater display surface size, for example, 10 inches diagonally with 640×480 pixels or more. The display systems used in this class of liquid crystal display device may roughly be divided into two: one is a simple-matrix system and the other an active matrix system.

The simple-matrix system features a simple structure in which the liquid crystal is held between two sheets of glass substrates provided with stripe-shaped transparent electrodes. The simple matrix system demands a high performance all the more from the liquid crystal.

Before describing this performance, we briefly explain the display principle of the liquid crystal display device. The liquid crystal display device achieves the display, changing the orientation of the liquid crystal molecules by varying the voltage applied on the liquid crystal.

Generally a large contrast requires a large differential voltage. A display with as many as 640×480 pixels has however only about 1 V voltage difference between the dark state and the bright state. Only 1 V of difference requires a large state alteration of the molecular liquid crystal. Much research has thus far been conducted to realize such a feat. In 1985, the research group of Shafer et al. found that the change in the alignment of the liquid crystal molecules responds sensitively to the change in voltage if the twist angle of the liquid crystal display device is enlarged and that the liquid crystal molecules have a certain tilt to get a stable arrangement with a large twist angle. Since this research report, the alignment technology to realize this has been briskly developed and successfully commercialized.

In general, 180° or more twist angle is necessary to materialize a display with as many as 640×480 pixels. The liquid crystal display device with such a large twist angle has been called "Super Twist Nematic" (STN). Note however that the STN display at early stage was not achromatic, but colored; for example, with green characters in yellow background. This is due to a twist angle that is too large. Japanese Patent Publication 63-53528 (1985) discloses a technique to resolve such problems as colored display. This method technique realizes an achromatic display by arranging a second liquid crystal cell with its alignment of the liquid crystal layer twisted in the opposite direction between a polarizer and a first liquid crystal cell.

The principle of this achromatization consists in resolving the optical rotatory dispersion, that is, a wavelength dependence of optical rotatory power, by transmitting the light produced this dispersion after passing through the first liquid crystal cell caused to have a large twisted molecular structure in the cell, through the second liquid crystal cell having a symmetrical structure to that of the first liquid crystal cell. As a result, the color caused by the optical rotatory dispersion was dissolved to materialize the achromatic display. In order to perform such a conversion exactly, it is necessary that the second liquid crystal cell, which is an optical compensation plate, has a retardation value substantially the same as that of the first liquid crystal cell with their twist directions being opposed to each other and their arrays being so configured that the directors of the liquid crystal display device cell molecules coming most closely to each other should intersect each other.

A variety of other techniques have so far been proposed. For example, optically anisotropic film may be used in place of the second liquid crystal cell. Lamination of the optically anisotropic film on the liquid crystal cell affords a performance substantially equivalent to that of the second liquid crystal cell.

The optical compensation as above makes it possible to display achromatically even on the STN display unit. Furthermore, this achromatic display combined with a color filter enables one to have a high value added colored display. Since, however, the simple multiplex system is based on the principle of multiplex drive, which in turn is based on the average voltage method, if the number of scanning lines is increased to augment the display capacity, the difference reduces remarkably between the voltage when the light is intercepted and that when the light is left to transmit, which may result in lower contrast or slower response of the liquid crystal. This is a critical weak point. Such conventional techniques are much problematical if one tries to realize a liquid crystal display device with higher display quality, because they may cause such negative phenomena as the display screen seen as reversed (that is, obverse and reverse) depending on the orientation and angle when viewing it, disappearance of the display image or the display catching colors.

On the other hand, the active matrix system, which is provided with a switching element comprising, for each display pixel, a thin-film transistor or diode, allows us to set a given voltage ratio on the liquid crystal layer of each pixel irrespectively of the number of scanning lines. No special performance such as that for the simple matrix system is required in the active matrix system. There is therefore no need to increase the twist angle as in the case of STN. It has been considered that an angle of 90° suffices for the active matrix system.

In the liquid crystal cell (TN) with a small 90° twist angle, the optical rotatory dispersion is small since the light rotates following faithfully the twist, which ensures a colorless, high contrast display. The response to voltage is more rapid than in the STN too. A favorable combination of the active matrix system with the TN will realize a liquid crystal display device featuring a large display capacity, higher contrast and higher response speed. Since further there is a switching element for each pixel, an intermediate voltage can be applied, which enables one to make a gray scale (half tone) image. Moreover, the TN as combined with a color filter will facilitate the materialization of a full colored display.

Even in the active matrix system, however, such phenomena are observed as an obverse-reverse display screen depending on the orientation of view, total disappearance of the display image and colored display when a gray-scale image (half tone) is displayed, though not so with a binary display. These phenomena are much problematical when one wants to realize a high quality liquid crystal display device.

Japanese Patent Laid-Open 62-21423 (1987) discloses a liquid crystal cell and a birefringence layer (which is a polymer film whose optical anisotropy is negative in the direction of its thickness) that are between two polarizers as a means to reduce the visual angle dependency. On the other hand, Japanese Patent Laid-Open 3-67219 (1991) discloses an arrangement on a liquid crystal cell of a birefringence layer composed of the liquid crystal compound (or high molecular liquid crystal) presenting cholesteric liquid crystal phase with 400 nm or less product of helical pitch length and refractive index. These two propositions have been contrived only for the cases of liquid crystal cells with homeotropically aligned liquid crystal cells (molecular liquid crystal arranged perpendicularly to the aligned substrate), not for such liquid crystal cell with twisted orientation as TN and STN systems. Japanese Patent Laid-Open 4-349429 (1992) proposes to control the viewing angle of liquid crystal display device by optional compensation element with arrangement of 360° or more tilt angle, but the effect of enlarged viewing angle cannot yet be considered sufficient for gradation display (gray scale image).

Though we have some technical reports on the improved viewing angle of TN-LCD by obliquely arranging the optical axis of negative optical anisotropic substance (Lecture Manuscripts for the 21st Liquid Crystal Conference), the compensation can not cover all the orientations of view. The basic principle of the display by the liquid crystal display device thus far described consists in performing an optical control by changing the orientation of the liquid crystal molecules through the voltage to be applied to the liquid crystal.

Thus, the liquid crystal display device has such a visual angle dependency that this device, when viewed as tilted, changes the orientation of the molecular liquid crystal thus changing the way it is seen. When a subtle gray-scale image is displayed, in particular, the viewing angle dependency is more conspicuous since the inclination of the liquid crystal molecules is changed minutely.

Such visual angle dependency of the way the alignment of the liquid crystal molecules is seen gives rise to such phenomena as a reversed image of display and a total lack of recognition. When, in particular, a colored display is made by a combination with a color filter, the reproducibility of the display reduces remarkably, which is one of the critical problems.

SUMMARY OF THE INVENTION

Accordingly, one of the objects of the invention is to provide the liquid crystal display device with enhanced contrast and improved viewing angle dependency of the display colors and the optical anisotropic element.

Briefly, in accordance with one aspect of the invention, there is provided a liquid crystal display device comprising at least one polarizer, a driving liquid crystal cell having two substrates and a liquid crystal layer held between at least the two substrates, at least one optical anisotropic element in which plural optical anisotropic units arrange in the direction of the layer thickness, wherein the optical anisotropic element is arranged so that the optical anisotropy of the optical anisotropic unit is negative to the direction of thickness, the angles of respective optical axes of the optical anisotropic units are not constant against the direction of the thickness and that the optical anisotropy has the minimum optical rotatory power in the thickness direction.

A liquid crystal display device having at least one polarizer, a driving liquid crystal cell having a liquid crystal held between two substrates and at least one optical anisotropic element in which plural optical anisotropic units run in a row in the thickness direction characterized in that the optical anisotropy of the optical anisotropic units of the optical anisotropic element is negative in the thickness direction, that the angle of the respective optical axes is not constant in the thickness direction, and that the optical anisotropic elements are so arranged as having minimum optical rotatory power in the thickness direction.

The angle between the optical axis of the optical anisotropic element and the substrate surface of the driving liquid crystal cell preferably varies continuously or stepwise (in stages) in the direction of the layer thickness of the optical anisotropic element.

In another aspect of this invention, there is provided a liquid crystal display comprising at least one polarizer, a driving liquid crystal cell with two substrates and a liquid crystal layer held between the two substrates, and at least one optical anisotropic element with one or more optical anisotropic units arranged between the polarizer and the cell, wherein the angles of the optical axes of the optical anisotropic units with the substrate of the element unit are substantially coincident to each other on both surfaces of the optical anisotropic element and the angles of the optical axis vary in the intermediate layer, and the optical anisotropy of the optical anisotropic element is negative to the direction of the thickness.

Furthermore, in another aspect of this invention, there is provided an optical anisotropic element comprising a plurality of optical anisotropic units arranged in the direction of the layer thickness of the element, wherein angles between optical axes of the optical anisotropic units and surfaces of the optical anisotropic element differ in the vicinity of the upper and lower surfaces of the optical anisotropic element, and the optical anisotropy of the optical anisotropic element is negative in the thickness direction.

In another aspect of this invention, there is provided an optical anisotropic element comprising a plurality of optical anisotropic units, wherein the optical anisotropic units have optical axes of which the angles are substantially coincident on both units of the surfaces of the element and vary in the intermediate units, and the optical anisotropy of the optical anisotropic element is negative in the direction of the thickness.

In another aspect of this invention, there is provided a liquid crystal display element comprising:
  at least two polarizers;
  a driving liquid crystal cell sandwiched between the polarizers, comprising two substrates with electrodes and a liquid crystal layer interposed between the two substrates; and
  at least one optical anisotropic layer with positive optical anisotropy, and at least one optical anisotropic layer with negative optical anisotropy,
  the optical anisotropic layers disposed between the polarizer and the driving liquid crystal cell and
of which an optical rotatory power in a direction slanted from the normal of the optical anisotropic layers is greater than that of the normal to the optical anisotropic layers.

In the context of this specification, the optical anisotropic unit means the respective layers of an optical anisotropic element with predetermined thickness that has a multi-layered structure. Each layer is a unit having an optical axis oriented toward a particular direction and comprises, when layered, a configuration that changes the inclination of the optical axis gradually in continuous or staged fashion. This invention defines here that the configuration in which the optical axes change in the direction of thickness means that the optical axes of optical anisotropic units in optical anisotropic element change in series in the direction of the thickness. This invention contains an optical anisotropic element without multi-layered construction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6a through FIG. 6d are schematic diagrams that illustrate the alignment of the optical anisotropic element by this invention;

FIG. 7a through FIG. 7f are schematic diagrams that illustrate the principle of the optical compensation when the optical anisotropic element by this invention is used.

FIG. 26a through FIG. 26c are schematic diagrams illustrating the configuration of the optical anisotropic element of embodiment 9;

FIG. 33 is a schematic diagram showing the scheme of the liquid crystal display device by embodiment 11;

DESCRIPTION OF THE PREFERRED EMBODIMENTS

Hereinafter, embodiments according to the invention will be described which are capable of achieving desirable viewing angle and bright display color when displaying gray scale is alleviated at the same time.

The polarized state of visible light propagating in a liquid crystal element such as a TN or STN depends upon whether the light comes in vertically or at a slant with respect to the display plane of the liquid crystal display device. This difference in polarized state is directly reflected on a reversed display or colored display image. Such a phenomenon is supposed to go on slanting largely the viewing angle of the display plane of the liquid crystal element from the normal (frontal face) of the display plane. This tendency is elicited particularly in the pixels where voltage is applied on the liquid crystal layers of a liquid crystal cell which has a means to apply voltage on the liquid crystal layers (hereafter referred to as "driving liquid crystal cell").

Figures 35A, 35B:
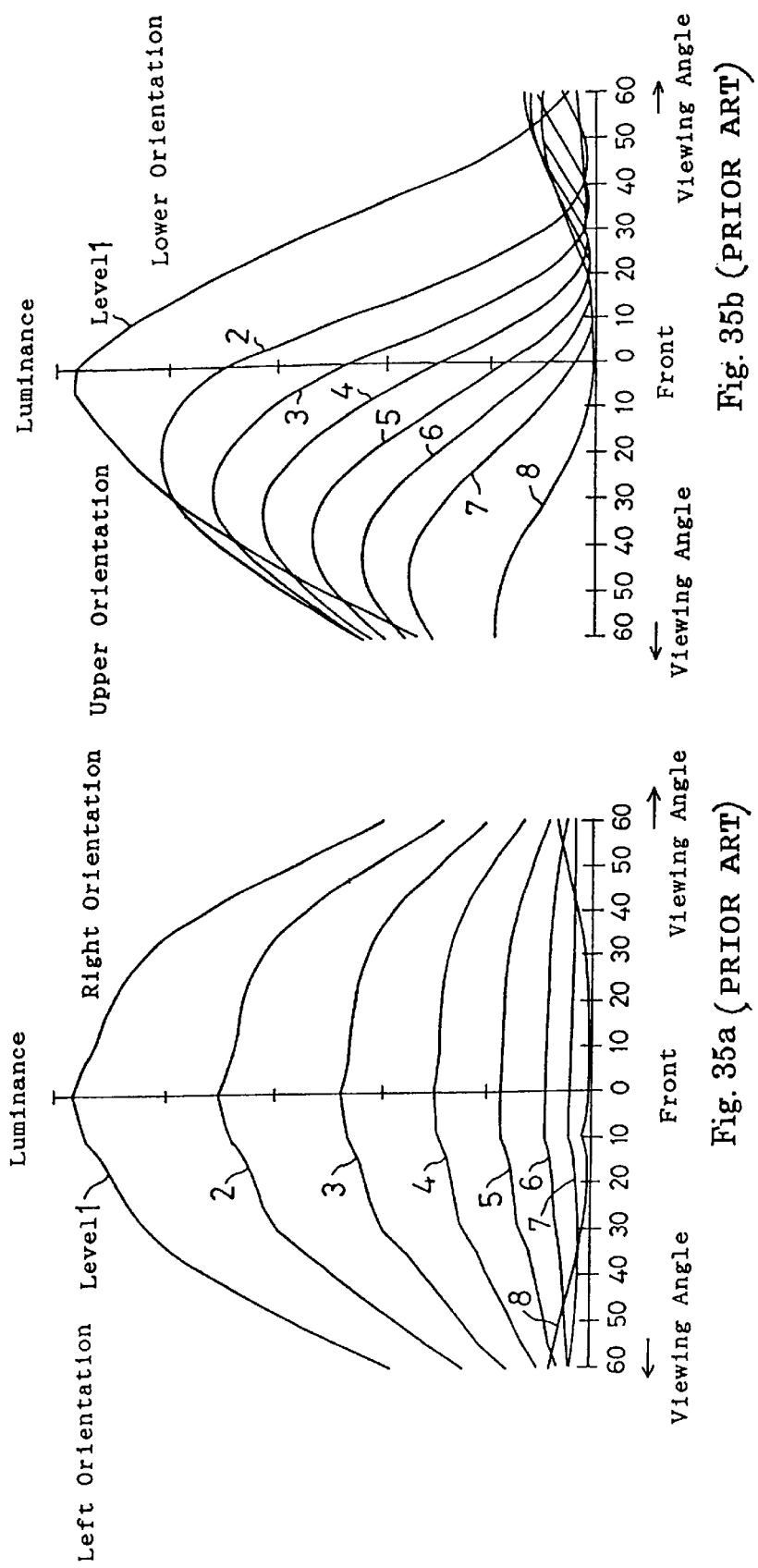
FIG. 35a and FIG. 35b are graphs showing the visual angle dependency of the luminance of a conventional TN type liquid crystal display device.

FIG. 35a and FIG. 35b show diagrammatically the angle dependency of display luminance when the horizontal and vertical inclination from the normal of display face (substrate face) of the conventional TN liquid crystal display device is from 0° to 60°. Levels 1 to 8 represent respective gradation numbers in the tonal display (assigning intensity levels), which manifests that the voltage applied to the liquid crystal cell differs sequentially. Applied to the liquid crystal cell is 0 V for level 1, and 5 V for level 8. In the case of upper orientation, for instance, the greater the angle (viewing angle) slanted from the normal of the display plane of the display unit (from 0°[front] to 60°), the greater the luminance becomes gradually. In the real display, the display color of this luminance intensity is recognized as whitish (an excessively bright image).

In the upper orientation shown in FIG. 35b, the luminance reduces more (contrary to the upper orientation), when the viewing angle is slanted gradually from front (0°) to 60°. In the actual display screen, this phenomenon is recognized as a darkening (excessively dark) of the image. The brightest display level 1 and lower gradation level 2 on the front face cross over at a 35° viewing angle in the upper orientation to reverse their relative magnitudes, which are observed as a reverse image such as a negative of a photo film in the actual display image. It is idealistic that the transmittance of light does not change; however, the viewing angle may vary at any gradation level whatsoever. However, the viewing angle characteristic of actual TN is relatively good in the right and left orientation, but bad in the vertical one.

The reason why such a phenomenon occurs is that the visual or viewing angle characteristic of the liquid crystal display device results from the polarized state which differs depending on the angle of incident light. We will argue this point later referring to an exemplary TN type device.

Figure 3B:
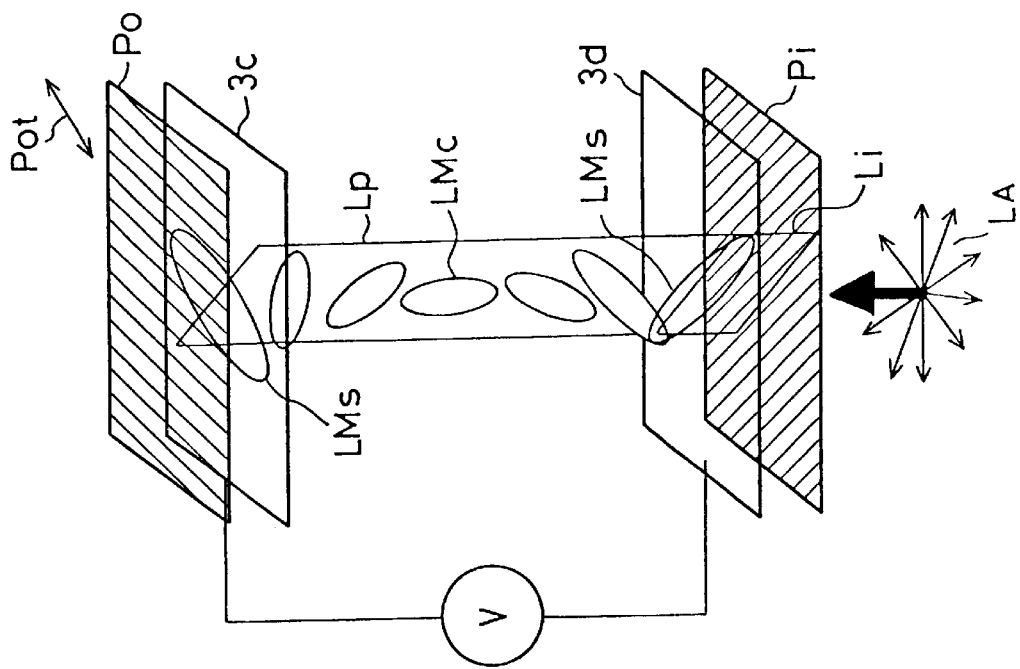
FIG. 3a and FIG. 3b are diagrams depicting the principle of operation of TN-LCD.
Figure 3A:
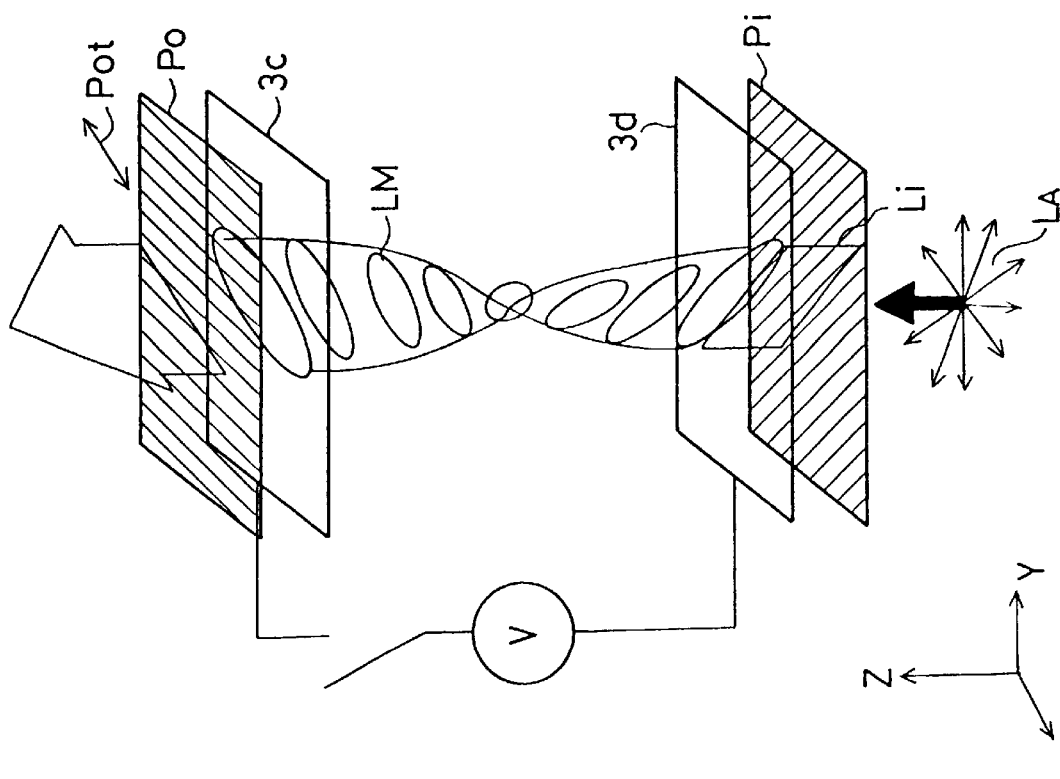

FIGS. 3a and 3b illustrate the principle of the operation of TN-LCD (TN type liquid crystal device). FIG. 3a represents the alignment of the liquid crystal molecules in the TN cell when no voltage is applied on the electrodes 3c and 3d. When voltage V is not applied, the liquid crystal molecules manifest a continuous twisted alignment of liquid crystal molecules, parallel to each other, in the direction of the thickness of the liquid crystal layers (direction of Z axis in the figure) nearly in parallel with the substrate. The liquid crystal molecules which have an optical axis in the direction of their longer axis form an optical axial plane because of the parallel alignment of liquid crystal molecules.

When the light beam Li, from among the incident light beams LA as polarized by the polarizer Pi, impinges this alignment, the polarized plane rotates according to the twisted alignment of the liquid crystal molecules LM. When the light leaves the liquid crystal layer it turns by the twist angle of the liquid crystal about the polarized plane before the light enters the liquid crystal layer. The transmitted light Lo is obtained when the transmission axis Pot of the analyzer Po is matched with this rotational direction.

FIG. 3b depicts the array of the liquid crystal cells in the TN cell when voltage is applied. Applying voltage V will raise the liquid crystal molecule LM The liquid crystal molecule LMs near the center of the cell is more tilted than the liquid crystal molecule LMs in the vicinity of the electrodes. The liquid crystal molecules LMs tilt little in the vicinity of the electrodes 3c and 3d because of the anchoring power at the electrode/liquid crystal layer interface, which is necessary to array the liquid crystal. As the voltage V increases, the liquid crystal molecules tilt more, and at the same time the twist array distorts. Finally, the twisting is released when the voltage attains a certain level. If, under these conditions, the polarized light Li incides, the polarized plane Lp does not rotate, and the liquid crystal layers are made to progress due to the inexistence of the twisted array, namely because the optical axial plane is on a single axis. Where the light leaves the liquid crystal layer, the polarized plane remains the same as before it entered the liquid crystal layer. Since the transmission axis Pot of the analyzer Po becomes orthogonal to the polarized plane Lp, the polarized light cannot transmit through. To display the half tone (gray scale image), the voltage to be applied on the liquid crystal layer is set lower and the twisted array remains somewhat so that the polarized plane on which the light leaves the liquid crystal layer rotated to a certain extent to yield an intermediate transmission of light.

This is the principle on which the TN device controls the system making use of the twisted array of the transmitting light. We now explain what phenomena occur to the slanted light.

Figure 4C:
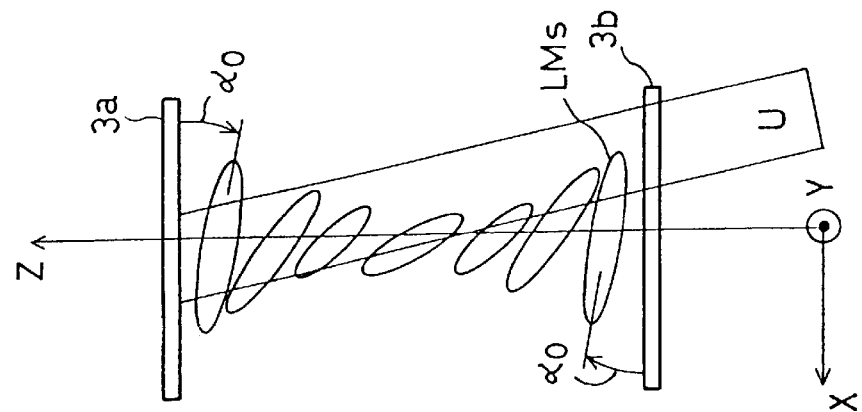
FIG. 4a, FIG. 4b and FIG. 4c are diagrams illustrating how the viewing angle characteristics of TN-LCD are generated.
Figure 4B:
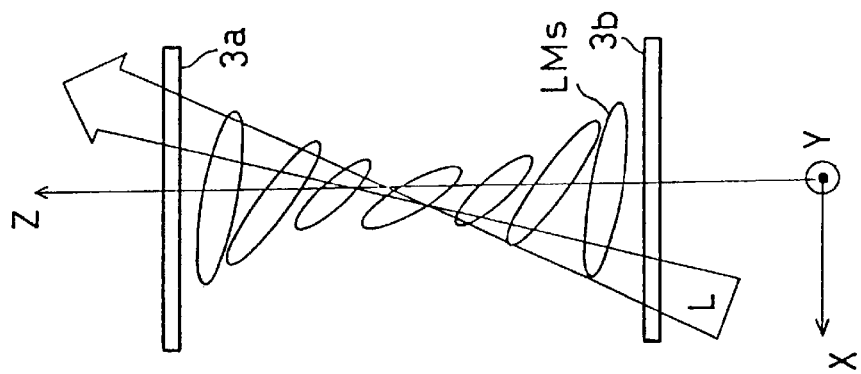
Figure 4A:
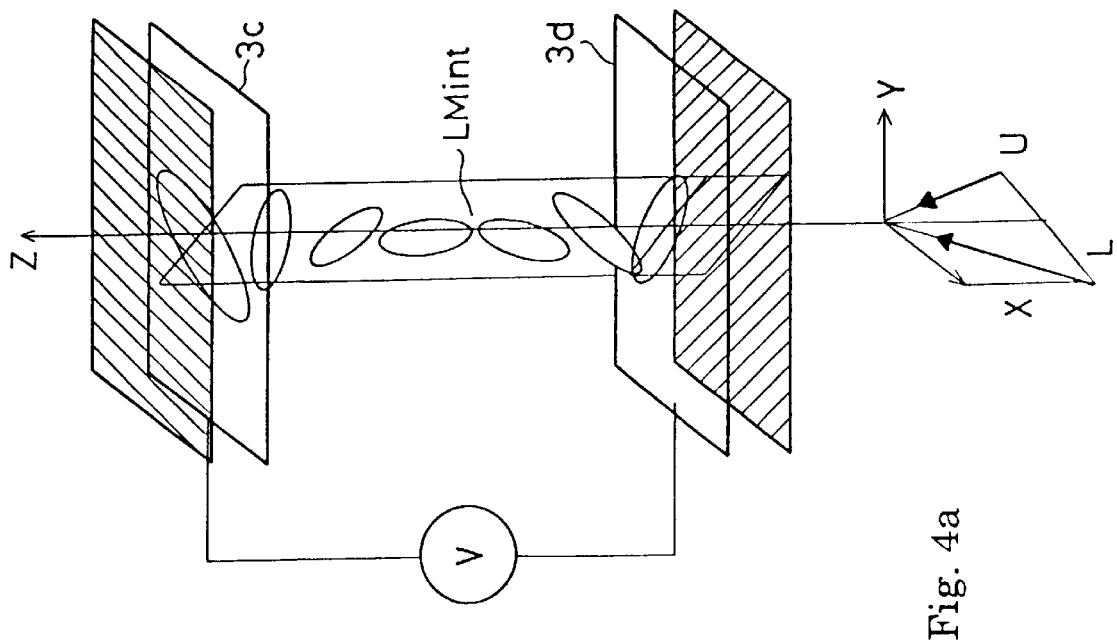

FIGS. 4a through 4c illustrate how the light comes in slanted on the molecular array when the half tone (gray scale image) is displayed. FIG. 4a is a perspective diagram showing the relationship of the molecular arrangement LMint when the half tone is displayed with the directions L and U of two incident light rays. For this diagram to be more comprehensible, FIG. 4b and FIG. 4c depicts the views from the direction of the Y axis, where the Z axis represents the direction of the norm of the substrate of the driving liquid crystal cell while the X and Y axes indicate the substrate faces. This slant or tilt is called "pretilt." In general, the pretilt signifies the tilting of liquid crystal molecules at the substrate/liquid crystal interface, and the tilting angle is called "pretilt angle $\alpha 0$."

When no voltage is applied the liquid crystal molecules are held inclined at the same angle over the upper and lower substrates 3a and 3b. If there exists a certain slant (pretilt) over the range with voltage to be applied, the directions of the inclination are justified into the pretilt direction, which will cause discrimination lines on the boundary of the region with different tilting directions to degrade remarkably the display quality. Consequently the pretilting is indispensable to get a uniform display, the angle of which is 1° through 6° in general. Note that any liquid crystal display device is endowed with this pretilt.

As has been illustrated in FIG. 4b and FIG. 4c, therefore, the array of the liquid crystal molecules becomes asymmetric to the Z axis particularly when the half tone is displayed. As for the polarized light obliquely impinging from the +X axis to the +Z axis in FIG. 4b, the array of the liquid crystal molecules LM loses the tilting characteristic as if in the array with no voltage applied, as shown by LM-L in FIG. 5, thus enabling large rotation of the polarized plane. As a result, the intensity of the transmitting light becomes greater than that of the outgoing light as against the incident light parallel to the Z axis. To the polarized light U incident from the symmetric orientation (obliquely from the −X axis to the +Z axis) with the opposed normal of the substrate as a reference, the array of the liquid crystal molecules LM becomes largely tilted as shown by LM-U in FIG. 5 as if further higher voltage were applied, thus disabling the polarized plane to be rotated. As a result, the intensity of the transmitted light becomes smaller than the intensity of the outgoing light as against the incident light parallel to Z axis. In the corresponding relationship to FIG. 35, the orientation of L in FIG. 35b and that of U in FIG. 4, to the lower orientation in FIG. 35b.

As has so far been explained, the orientation dependency of the transmitting light at half (intermediate) tone results from the asymmetric array of the liquid crystal molecules. Due to this asymmetry of array, the rotational angle (optical rotatory power) of the polarized face depends on the direction from which the light comes, which will result in a change in the transmittance. In the case of TN-LCD, it may be that there is a tendency for the optical rotatory power to be generated in the upper orientation and the same power to be reduced in the lower one. In consequence, an addition of such optical anisotropic element that decreases the optical rotatory power in the upper orientation and generates the same in the lower one will contribute to the improvement of the viewing angle dependency of the liquid crystal display device.

To summarize, the first characteristic required for the optical anisotropic element is that the rotational direction of polarized light in the upper orientation be reversed with respect to that in the lower one for any driving liquid crystal cell whose viewing characteristic is not good either in upper or lower orientation.

The second characteristic required is enhancement of the viewing characteristic in other orientations.

This invention provides the optical anisotropic element having such characteristics as above and the liquid crystal display device equipped with this optical anisotropic element.

Now we describe the configuration of the optical anisotropic element according to this invention.

Figure 9:
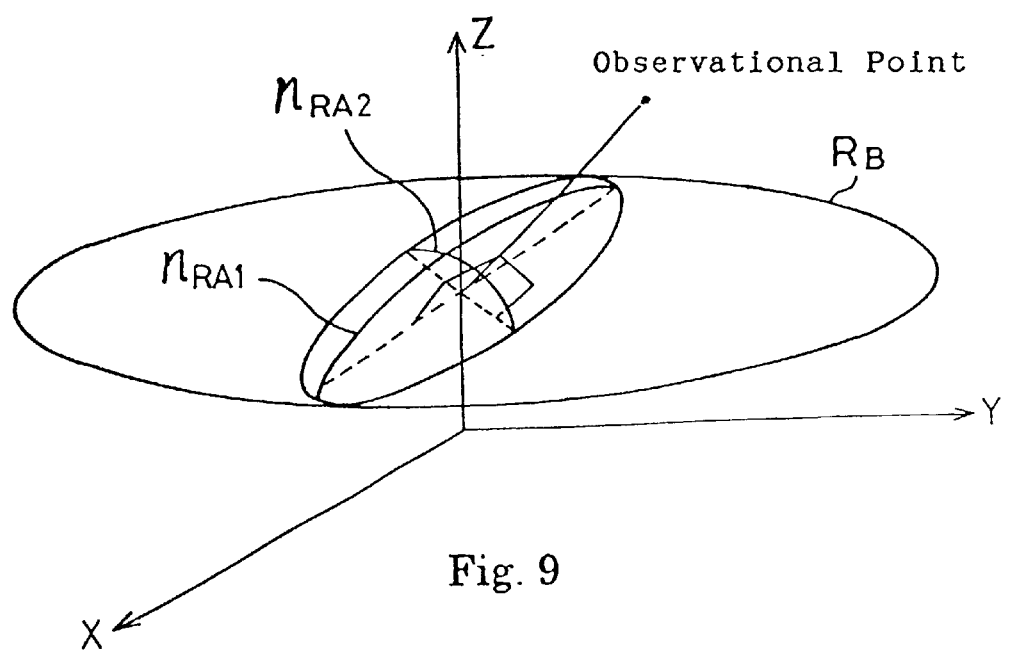
FIG. 9 is another schematic diagram showing the optical indicatrix of the optical anisotropic element which is negative in refractive index anisotropy in the direction of the thickness.

The optical anisotropic element by this invention is an optically anisotropic membrane, plate or sheet-shaped planar body of a certain thickness. As shown in FIG. 9, the element with negative optical anisotropy has small refractive index of the optical axis, that is, the Z axis which is perpendicular to the direction of the X-Y axes that constitute the plane.

We define any optically anisotropic thin layer with its optical axis oriented to a certain direction as optical anisotropic units assuming that the foregoing optical anisotropic element consists of these units stacked into multilayers. The element includes also any configuration of these units without clear division of layers.

In consequence, in the representative embodiment of this invention is a liquid crystal display device, the optical anisotropic element has the optical anisotropy of the optical anisotropic units which is negative in the direction of thickness, that the angle of the respective optical axes is not constant in the thickness direction and that the minimal optical rotatory power is obtained in the direction.

An embodiment of this liquid crystal display device of this invention is an optical anisotropic element of a hybrid construction wherein the optical axis runs substantially parallel to one plane, from the one plane of the element to the other, it changes its slant gradually toward another plane and becomes substantially perpendicular to the plane of other orientation.

This invention further has an embodiment with improved viewing angle dependency that consists in a combined body of optical anisotropic elements wherein at least a layer of optical anisotropic units with an optical anisotropy is combined with at least another layer of other optical anisotropic units with an optical anisotropy different therefrom. The set of combination uses a pair of optical anisotropic structures, for example positive and negative in anisotropy, in which the optical rotatory power in the direction slanted from the direction of the normal is greater than that in the direction of the normal. This set is disposed, for example, on both sides of the driving liquid crystal cell.

The characteristic required for the optical anisotropic element is the "rotational direction of polarized light in the upper orientation is reversed to that in the lower one." FIG. 6 illustrates the alignment of the optical axes in the optical anisotropic element according to this invention, while FIG. 6a depicts the cross sectional view of optical anisotropic element in an embodiment of this invention where the ellipse represents the optical anisotropic bodies that constitute the optical anisotropic element, the longer axis of this ellipse corresponding to the optical axis OL.

The normal to the shorter axis of the ellipse is equivalent to the optical axis OL. The unit may be a molecule or plural molecules running in rows into a laminated layer.

From the lower substrate 2b over to the upper one 2a, the inclination of the longer axis changes continuously, being nearly parallel to the substrate face in the vicinity of the lower substrate 2b and substantially vertical to the same near the upper substrate 2a (hybrid alignment). FIG. 6b is a top view of this array. The arrows in the ellipses in this figure represent the orientation of optical axes. Note that the orientations of respective optical axes in the layer converge into a same plane, that is, are justified in a row on a single axis. FIG. 6c illustrates the array as viewed obliquely to the Z axis. The directions of the slant are indicated by X, Y and Z axes in the figure. FIG. 6d depicts the same, but viewed from reversed oblique direction. As is clear from FIGS. 6c and FIG. 6d, if the array of FIG. 6a viewed obliquely to Z axis, the array twists leftward in the direction of progress increasingly as it progresses from lower to upper area in FIG. 6c, while it twists rightward in FIG. 6d. The optical anisotropic element with such an oblique array contributes to the realization of the characteristic: "the rotational direction of the polarized light is reversed in upper orientation from that in the lower one."

The optical anisotropic elements by this invention may be regarded as a structure in which the layer units of optical anisotropic substance are optically laminated into multilayer construction in the direction of the thickness. In this construction the respective layer units have their own optical axes and the slants of these axes vary continuously or stepwise. Furthermore, such an optical axis array has been adopted where the minimal optical rotatory power is in the direction of thickness.

Now we will describe how these optical anisotropic elements should be combined with the drive cell to get an excellent compensation effect.

Figure 5:
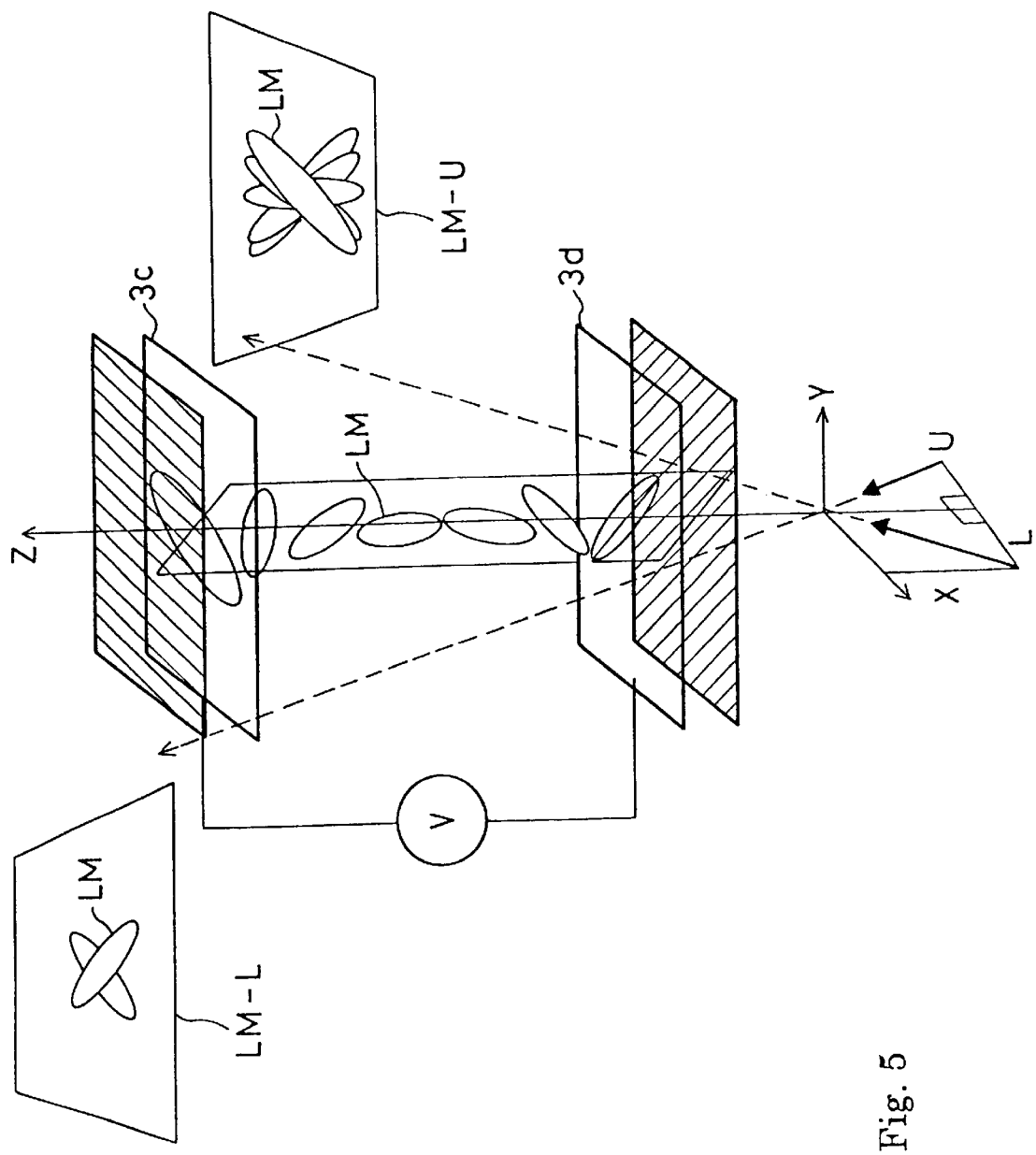
FIG. 5 is a diagram that illustrates how the viewing angle characteristics of TN-LCD are generated.

FIG. 7a illustrates the liquid crystal cell as shown in FIGS. 3, 4, and 5, adding arrows similar to those in FIG. 6, where the symbol Lip represents the polarized axis of incident light and Lop, that of outgoing light. FIG. 7a shows an optical anisotropic element and FIG. 7b shows the driving liquid crystal cell (TN) to which a voltage equivalent to half (intermediate) tone is applied, both as viewed from the Z axis.

FIG. 7c illustrates the array of the molecules of respective optical anisotropic substance layers that constitute the optical anisotropic element viewed as projected on the +X axis side from the Z axis side. This figure depicts the optical rotational status when the straight polarized light is incident on.

FIG. 7c depicts the array of the optical axes of an optical anisotropic element as viewed showing it from on the Z axis to the +X axis where the status of polarized light when a straight polarized light comes in is shown. In this direction, the optical anisotropic element is apt to rotate the polarized face of the incident light into the left direction (left rotatory power). FIG. 7d shows an array of drive cells viewed in the same way as in FIG. 7c.

The liquid crystal molecules are slanted due to the application of a voltage a little higher than the voltage equivalent to the half (intermediate) tone (critical or threshold voltage at which the liquid crystal can function). If viewed from this direction, there arises an alignment portion where the length of the liquid crystal molecules in the longer axis of ellipse is substantially equal to the length in the shorter axis direction. The polarized incident light, therefore, transmits without much rotation, and the direction of the polarized axis Lop of the outgoing light is nearly the same as the polarized axis Lip of the incident light. This causes the abnormal display called excessively dark image, which may be improved if the polarized light is rotated counterclockwise to intensify the optical rotatory power. The optical anisotropic element as shown above in FIG. 7c is suited to this improvement. The optical anisotropic element as shown in FIG. 7c has the left rotatory power, which makes up for the polarized light lacking in the driving liquid crystal cell.

The same will be explained, but in reversed orientation, referring to FIG. 7e and FIG. 7f. FIG. 7e and FIG. 7f represent the array of optical axes when the optical anisotropic element as shown in FIG. 7a is observed from the direction of Z axis toward the −X axis. This array has a characteristic to rotate clockwise the incident light shown (right rotatory power). FIG. 7f schematically shows a state with voltage of half tone applied as was the case with FIG. 7d. From this direction the liquid crystal molecules look like it is slanted, though it is not in reality, and a large optical rotatory power is given for that reason. This may cause too bright a display, which is an abnormal display called "excessive bright image." If we apply, however, the right polarized light that controls the counterclockwise polarized light, excessive polarized light can be dissolved to improve the "excessive bright image." The optical anisotropic element as shown in FIG. 7e has the right rotatory power, which if, combined with the drive cell, will acquire an improvement of characteristic.

Thus far we have illustrated the principle of enlarged viewing angle by example of an optical anisotropic element with hybrid alignment whose rotatory power in a direction slanted from the normal to the optical anisotropic element is greater than that in the direction of the normal. Further the optical anisotropic element with twisted hybrid alignment and one with uniformly tilted alignment between upper and lower substrates may present characteristics similar to those of the optical anisotropic element with hybrid alignment, which can be selected in terms of the design specification of the liquid crystal display device.

Thus far we have explained with TN taken as an example. Since the same principle is applicable also to STN, it can be used as a means to improve the viewing angle of STN.

The optical anisotropic body with negative optical anisotropy is endowed with such hybrid array as gives an optical rotatory power oblique to the element greater than that in frontal direction (Z axis). This characteristic is much effective in eliminating such abnormal display as "excessively darkened image" and "excessively bright image". The explanation above showed an example where the optical anisotropy of the optical anisotropic units constituting the optical anisotropic element is negative.

Needless to say, similar effect is displayed even when the anisotropy is positive if the oblique rotatory power is greater than that in the frontal direction.

The foregoing description involves the hybrid array, but it is not only in this array that the oblique optical rotatory power can be greater than that in the frontal direction. The same effect may be obtained also with the array where the optical axis of the optical anisotropic units constituting the optical anisotropic element is twisted in the plane of the element as viewed from the direction of the normal to the element, with the array where the orientation of the optical axis on both end faces of the optical anisotropic element is the same and the internal arrays varies continuously or stepwise (or in stages), and with the bend and spray arrays where the hybrid arrangements are superposed.

The retardation value of the optical anisotropic element is preferably smaller than that of the driving liquid crystal cell, and more preferably is close to the retardation value of the driving liquid crystal cell when the voltage for displaying the half tone (gray scale image) is applied. But this value, which depends on the product specification and mass production, is not necessarily limited to those values. The array and alignment of the optical anisotropic element vary largely depending upon the product specification, mass production and cost in terms of the optical anisotropic elements combined and their number.

It goes also without saying that similar effects may be given when combining the viewing characteristic with the optical anisotropic element where the optical anisotropic bodies with optically positive anisotropic units are diversely arranged or with the optical anisotropic elements where the optical anisotropic bodies with optically biaxial optical anisotropic substance are diversely arranged.

As an exemplary substance presenting negative optical anisotropy, we may enumerate $C_{18}H_6(OCOC_7H_{15})$ having a triphenylene core with alkyl chain by ester bond and $[C_6(OCOC_mH_{2m+1})_6]$ having a benzene core, which are called discotic liquid crystal. These discotic liquid crystals may be used in crystal phase so that their array should not alter by forming the desired array in a temperature zone presenting a liquid crystal phase. Furthermore, it is possible to control, by voltage, the viewing characteristic if the temperature range presenting the liquid crystal phase is employed as the working temperature range for liquid crystal module and the optical anisotropic elements are so produced as can control the array by electric field.

Because the present invention uses the optical anisotropic substance constituting the optical anisotropic element whose optical axis slants negative differently, the element displays still enhance the visual angle improving effect. Now we will describe the principle by which the angle of field characteristic is enhanced when using any liquid crystal of optically negative anisotropy.

Figure 8:
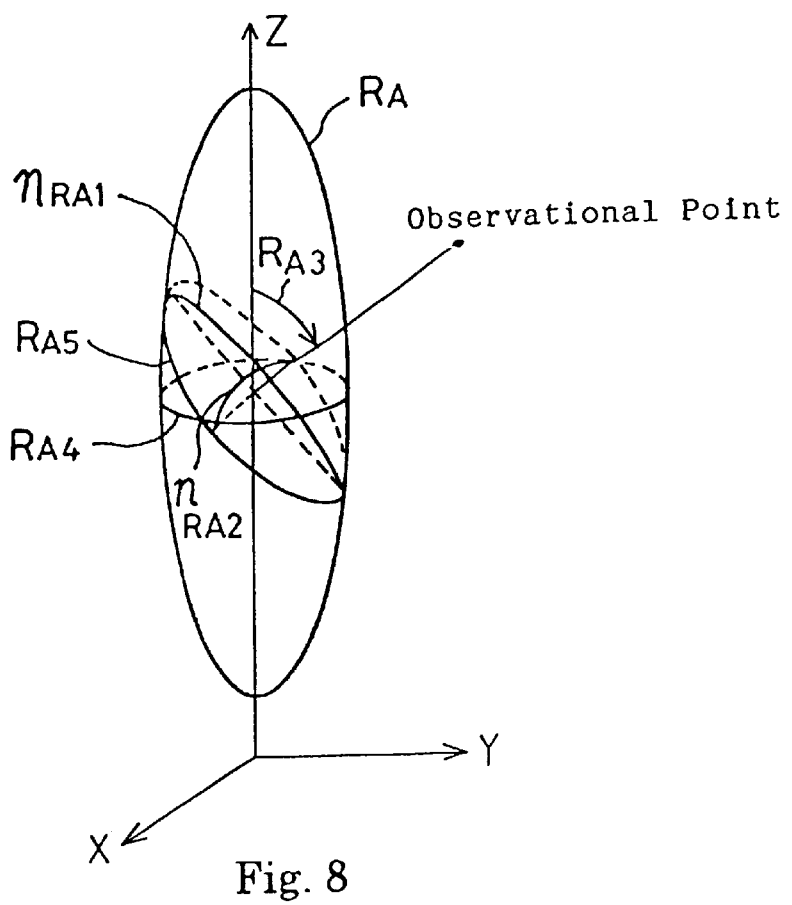
FIG. 8 is another schematic diagram that illustrates the optical indicatrix for driving liquid crystal cell when voltage is applied.

FIG. 8 represents the conditions of driving the liquid crystal cell under which a voltage equal to or higher than the threshold voltage is applied to the cell, as expressed by a three-dimensional optical index- shape (index ellipsoid). In this figure, the Z axis exhibits the direction of the thickness of liquid crystal cell, whole X and Y planes correspond to the substrate face of the liquid crystal cell. The phenomenon of birefringence is represented by the geometrical shape of elliptical cut face (called "index ellipsoid with two-dimensional plane") as formed when the normal plane on the central point of the optical indicatrix (index ellipsoid) RA of a line connecting an observation point when the central point of the liquid crystal cell is viewed from a direction on the one hand, and the central point of this optical indicatrix, on the other.

The difference between the longer axis and shorter axis of this optical indicatrix within a two-dimensional plane correspond to the phase difference (retardation value) between the ordinary and extraordinary lights, and if the transmission axes of the polarizers holding the liquid crystal cells inbetween are orthogonal with each other, the transmitting light of the liquid crystal cells is intercepted if the retardation value is zero, and if the same value is not zero, the transmitting light corresponding to the retardation value and wavelength of the incident light is generated.

When the light is vertically incident on the substrate face of the liquid crystal cell (namely, when the cell is viewed from a position directly opposite), the optical indicatrix RA4 in the two-dimensional plane becomes a circle, and the retardation value is zero between the ordinary and extraordinary lights. When the light enters from the direction RA1 slanted from the substrate face of the liquid crystal cell, the optical indicatrix RA5 becomes elliptic, retardation values produce a difference between the ordinary and extraordinary light. Thus the polarized state of the light transmitting through the liquid crystal cell differs in the direction directly opposite and slanted direction.

As the viewing angle RA3, that is, the angle at which the optical indicatrix RA shown in FIG. 8 is seen, is made to grow, the optical indicatrix RA5 in the two-dimensional plane grows larger in the longitudinal direction, thereby showing a transmitting light larger than when viewed from the direction of the visual (viewing) axis RA1. Idealistically it is desirable that the optical indicatrix in the two-dimensional plane does not change in its geometrical shape in any orientation whatsoever when the viewing angle is changed.

The optical compensation as above can be realized by placing the disk-like optical indicatrix RB as shown in FIG. 9 on the Z axis of the optical indicatrix RA shown in FIG. 8 (namely, to be arranged just on or under the liquid crystal cell). Thus, when the viewing angle RA3 is made to grow gradually, the optical indicatrix RA5 in the two-dimensional plane of the optical indicatrix RA grows in the direction of length, while the refractive index of the optical indicatrix B increases in the direction of the length of nRA2. As a result, the optical indicatrix composed in the two-dimensional plane becomes circular, thereby enabling to compensate optically for the optical indicatrix A to improve the visual angle characteristic.

In an actual liquid crystal display device, the longer axis of the optical indicatrix of the driving liquid crystal cell is not perpendicular to the display plane as shown in FIG. 8, but a little slanted. In consequence, it is desirable that the shorter axis of the disk-like optical indicatrix B of the optical anisotropic element shown in FIG. 9 be slanted in response thereto to compensate for the above inclination.

Actually, such optical indicatrix as shown in FIG. 9 can be realized by constituting it with the optical anisotropic element composed of a layer of optical anisotropic substance having an array of continuously twisted optical axes or with some material whose refractive index is smaller in the inplane direction than in thickness direction.

We now attempt to describe how to realize an optical anisotropic element with negative optical anisotropy composed of layers of optical anisotropic substance with optical axes in a continuously twisted array.

Generally the liquid crystal cell performs the display, changing the polarization direction of the light with visible wavelength range (from 380 nm to 750 nm under normal conditions) by the voltage to be applied to the liquid crystal cell.

In the case of the optical anisotropic element for optical compensation according to this invention, the optical rotatory power may be produced depending on the optical conditions of the optical anisotropic element, because the optical axes of the layer of optical anisotropic substance are continuously twisted. The rotatory power in this context means the nature of the light whose vibrational direction rotates right or left about the advancing direction as the light progresses through the medium. Suppose now that the retardation value of the optical anisotropic element whose optical axes are continuously twisted is constant. If the twist pitch of optical axis is long, the light rotates its polarized face in accord with the twist of optical axes, while the light cannot follow the twist of optical axes if the twist pitch is too short, thus the optical rotatory power not being produced. If the optical rotatory power of the optical anisotropic element is great enough, the polarized face of the light transmitting through this element comes to be changed, resulting in reduced contrast, or in some cases, variations in polarized face due to the wavelength of the light. From this, such problems may arise as coloring of the light which has transmitted through the optical anisotropic element.

It is therefore necessary that the optical rotatory power of the optical anisotropic element to the visible light be smaller than that of the driving liquid crystal cell to the visible light. The optical rotatory power largely depends on the wavelength of the light passing through the medium and on this medium itself. The largeness of the optical rotatory power is expressed by the degree of the change in retardation value of the medium to the change in optical axes.

Therefore, the largeness of the optical rotatory power of the driving liquid crystal cell may be expressed by the following formula:

$$\Delta n1 \times d1/T1 = R1/T1 \qquad [1.1]$$

where $R1 = \Delta n1 \times d1$ (retardation value)
 $\Delta n1$: difference of the refractive index no of the liquid crystal of the driving liquid crystal cell to the ordinary light from the refractive index to the extraordinary light ne (=ne−no: refractive index anisotropy)
 d1: thickness of liquid crystal layer
 T1: angle of the twisted array of liquid crystal layer (twist angle)

Similarly, the largeness of the optical rotatory power of optical anisotropic element for compensation can be expressed by the following formula:

$$\Delta n2 \times d2/T2 = R2/T2 \qquad [1.2]$$

where $R2 = \Delta n2 \times d2$
 $\Delta n2$: refractive index anisotropy of the optical anisotropic substance layer of optical anisotropic element for compensation
 d2: thickness of the laminated optical anisotropic substance layer
 T2: total twist angle of the optical axes of the optical anisotropic substance layers.

From the formulas [1.1] and [1.2], the largeness relationship of the optical rotatory power of optical anisotropic element for compensation with that of the driving liquid crystal cell can be represented by the following formula:

$$(R1/T1) > (R2/T2) \qquad [1.3]$$

The propagation of the light through the optical anisotropic element whose optical axes of optical anisotropic substance layer is twisted continuously may be represented by the parameters shown by the following formula (C. Z Van Doorn, Physics Letters 4, 2A, 7 (1973)).

$$f = \lambda/(p \times \Delta n) \qquad [1.4]$$

where λ=wavelength of the light in vacuum (visible wavelength range)

p=twist pitch length of optical axes (p=d/T).

If f<<1, the polarized face of the light in the optical anisotropic element changes pursuant to the twist angle acquiring thus the optical rotatory power. As has been described earlier, the optical anisotropic element is desired to have small rotatory power and must satisfy the condition f>>1. From formula [1.4], $$p \times \Delta n < \lambda \quad [1.5]$$

should hold for the optical anisotropic element.

Any liquid crystal with extremely large twist angle, namely with shorter helical pitch is called "cholesteric liquid crystal" in general. If the product (n×p) of the length of the helical pitch of this liquid crystal, p and the average refractive index of the cholesteric liquid crystal, n falls into the visible wavelength range (depending on conditions, 360 nm to 400 nm for the extreme of short wavelength and 760 nm to 830 nm for long wavelength extreme), there arises selective scattering (J. L. Fergason; Molecular Crystals. 1. 293 (1966)). Such a phenomenon is observed not merely in the cholesteric liquid crystal cell, but also in the optical anisotropic element whose optical axes of optical anisotropic body are continuously twisted. If the selective scattering occurs, the coloring phenomenon of optical anisotropic element is produced to change the display color. This coloring phenomenon can therefore be prevented if the visible wavelength range excludes the product n×p of the average refractive index of the optical anisotropic substance layer constituting the optical anisotropic element and the twisted pitch of the optical index p.

Further the optical anisotropic element can be made from laminated retardation film in which optical anisotropy has been developed by drawing high molecular film, liquid crystal cell with twisted array, and thin film in which the high molecular liquid crystals are twist-arranged. In this case the optical anisotropic element can be obtained by applying this high molecular layer on at least one of the substances of the driving liquid crystal cell. This process facilitates production and allows one to obtain a more desirable liquid crystal display device. For instance, one can use such high molecular copolymer as having polysiloxane as the principal chain and a suitable proportional ratio of biphenyl benzoate and cholesteryl group as side chains.

The similar effects may be given by these optical anisotropic elements that can be manufactured not merely between the polarizers and substrates but also in the cells inside the substrates. For example, the high molecular liquid crystal may be applied on the inside of the substrate on which the film may be aligned.

However, a sheet of optical anisotropic element or plural sheets of the same type is used to realize the required characteristic that the rotational direction of polarized light in the upper orientation is reversed in the lower one, the thickness becomes too great, retardation value too large or the display color altered. The reason is that the light transmitting through the optical anisotropic element produces the birefringence effect with the rotation of light thus causing the straight polarized light to become elliptical polarized light. The ellipticity of this elliptical polarized light, which depends on the wavelength of the light, causes the transmitting light to be dependent on wavelength, thereby causing the coloration.

We then discovered the optical rotatory power and coloration can be duly dissolved by a combination of an optical anisotropic element consisting of optical anisotropic units of negative or positive optical anisotropy with similar element, but of positive or negative anisotropy which is hybrid-arrayed.

Now we will describe the positive optical anisotropic element to be combined with the negative one.

As was explained earlier with regard to the negative optical anisotropic element, we will describe a characteristic wherein the rotational direction of the polarized light in upper orientation is reversed in the lower one.

FIG. 24 illustrates how the optical axes of the optical anisotropic element by this invention has been aligned. FIG. 24a represents a cross-sectional view of the optical anisotropic element in an embodiment by this invention. The ellipse depicts the optical anisotropic bodies LD that constitute the optical anisotropic element where the longer axis of the ellipse corresponds to the optical axis OL. The inclination of the longer axis changes continuously from the electrode of the lower substrate 2b to the electrode of the upper substrate 2a, which is nearly parallel to the substrate plane in the vicinity of the lower substrate electrode and substantially vertical in the neighborhood of the upper substrate electrode (hybrid alignment). FIG. 24b illustrates an example of the arrangement as viewed from the top. The arrow in the ellipse indicates the orientation of the optical axis. Note that the orientation of the respective optical axes in the layer lies in the same plane, that is, lies justified in a row on a single axis. FIG. 24c represents an array diagram as observed obliquely from the Z axis direction. The slanting direction is expressed by X-Y-Z axes in the figure. FIG. 24d is the same view as observed from a diagonally oblique direction. As is clear from FIGS. 24c and 24d, the alignment of FIG. 24a, if viewed obliquely from the Z axis direction, twists counterclockwise in the direction of progress as it goes from lower to upper portion in FIG. 24c, and it twists counterclockwise in FIG. 24d. Thus, the optical anisotropic element with optical axes obliquely aligned contributes to the realization of the foregoing characteristic that the rotational direction of the polarized light in the upper orientation is reversed in the lower orientation.

We now explain how such optical anisotropic element should be combined with the driving liquid crystal cell to get an excellent compensation effect.

Figure 25E:
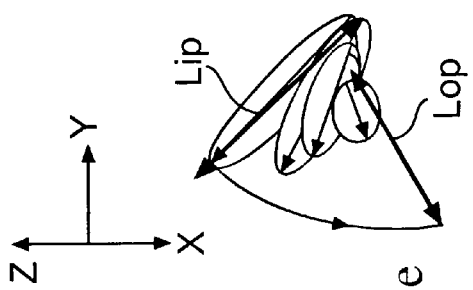
FIG. 25a through FIG. 25f are schematic diagrams showing the optical compensation principle using the optical axes of the driving liquid crystal cell relating to this invention.
Figure 25F:
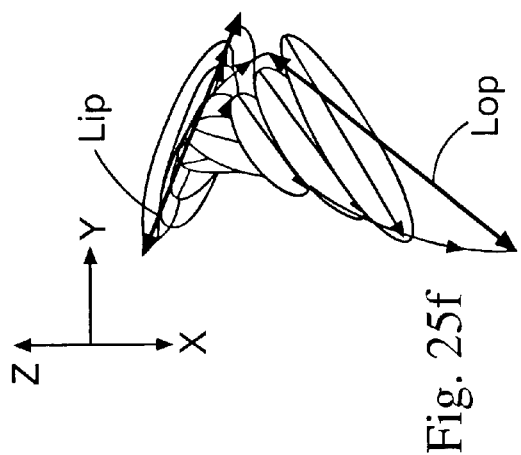
Figure 25C:
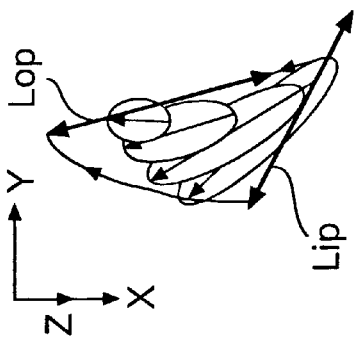
Figure 25D:
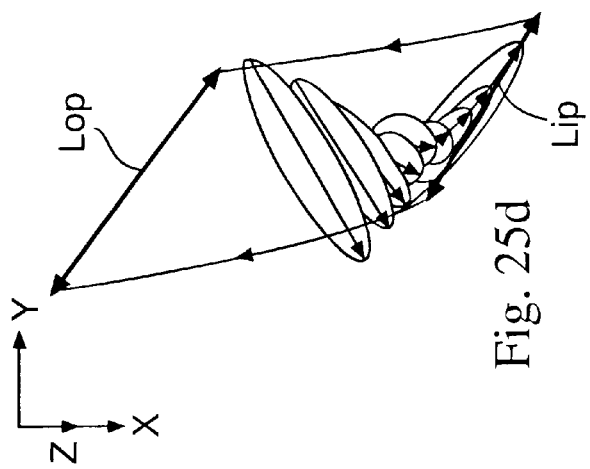
Figure 25A:
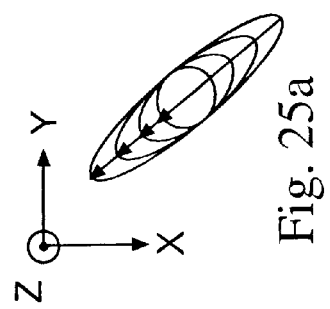
Figure 25B:
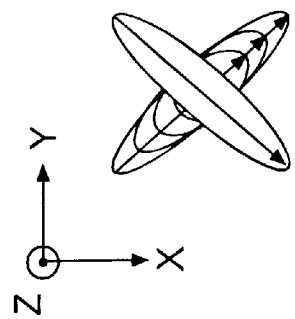

FIG. 25a is a schematic diagram of the liquid crystal cell as shown in FIGS. 3, 4, and 5 with arrows similar to those in FIG. 24. In this FIG. 25a the characters Lip and Lop represent the polarized axis of incident light and that of outgoing light, respectively. FIGS. 25a and 25b depict the optical anisotropic element and the driving liquid crystal cell (TN) to which voltage equivalent to the half tone (gray scale image) has been applied, respectively, both viewed from the Z axis direction. FIG. 25c represents the array of the optical axes of the optical anisotropic element as projected on the +X axis side from the Z axis side, in which the polarized light status is shown when the straight polarized light comes in. In this direction, the optical anisotropic element has the nature to rotate, right and left, the polarized plane of the incident light (left rotatory power). FIG. 25d shows the array of the driving liquid crystal cell when viewed from the direction same as in FIG. 25c. The liquid crystal molecules are slanted obliquely due to the voltage applied which is a little higher than the voltage equivalent to the half tone (critical voltage or threshold voltage for the liquid crystal to function). If viewed from this direction, there will arise an alignment portion where the length of the liquid crystal molecule in the direction of longer axis becomes the same as that in the direction of shorter axis.

The incident light therefore transmits without much rotation, and the direction of the polarized axis Lop of the outgoing light is nearly the same as that of the outgoing light Lip. This causes the display called "excessive dark image." The darkened display will be improved if the polarized light is rotated counterclockwise to increase the light rotatory power. Suited to this is the optical anisotropic element shown in FIG. 25c. This optical anisotropic element having the left rotatory power, the driving liquid crystal cell may compensate for the rotational light.

It can be explained that the same principle in reverse orientation referring to FIGS. 25e and 25f, which show the array of the optical axes of optical anisotropic element as observed from the −X axis in the Z axis direction. This array has the characteristic to rotate the axes of the incident light shown clockwise (right rotatory power). FIG. 25f illustrates the state of voltage equivalent to the half tone (gray scale image) applied as was the case with FIG. 25d. The liquid crystal molecules look slanted, though not so in reality, which contributes to the generation of large rotatory power. This causes the abnormal display called "excessive bright image." Thus, an application of the right polarized light may control the counterclockwise polarized light to dissolve the excessive polarized light thereby improving the excessive brightness. For the optical anisotropic element, as shown in FIG. 25e having the right rotatory power, the combination of this power with the driving liquid crystal cell will enhance the characteristic.

We have explained the principle for enlargement of the angle of field taking an example of the optical anisotropic element with a hybrid array where the optical rotatory power in the direction slanted to the normal to the surface of the optical anisotropic element is greater than that in the direction of the normal. However, the optical anisotropic element with twisted hybrid alignment or that with the alignment uniformly tilted between the upper and lower substrates will elicit the characteristic analogous to that of the optical anisotropic element with hybrid alignment. One of these optical anisotropic elements may therefore be selected in terms of the design specification of the liquid crystal display device. Though we described the principle with TN as an example, the same principle can apply also to STN and hybrid-aligned nematic liquid crystal. Thus the principle may contribute to the enhancement of the viewing angle of the STN.

Thus, the hybrid array of the optical anisotropic units showing negative optical anisotropy gives the characteristic that the optical rotatory power of the element in oblique direction is greater than that in frontal direction, which has much improving effects mainly on such abnormal display as "excessive dark image" and "excessive bright image." This same characteristic can display similar effect even when the optical anisotropy of the optical anisotropic substance is positive.

This invention may improve the visual angle dependency of the driving liquid crystal cell in every orientation by combining at least one, positive in optical anisotropy, and one negative sheet of optical anisotropic layers or elements.

The foregoing explanation took up, as an example, the case where the optical anisotropic element is hybrid-aligned in optical anisotropic units, but the characteristic that the optical rotation in oblique direction is greater than that in frontal direction is not limited to such an alignment. The same characteristic, and consequently the same effect can be obtained in such an array wherein the optical axes of the optical anisotropic substance layer constituting the optical anisotropic element is twisted when viewed from the direction of the normal to the element or else the orientation of the optical axes on both end faces of the optical anisotropic element is one and same with the internal array changing continuously or stepwise.

It is preferable to use the ultraviolet-hardening type liquid crystal which is the liquid crystal provided with such a polymerisable functional group as acryoyloxy group for the foregoing optical anisotropic element to be realized.

EMBODIMENT 1

Figure 1:
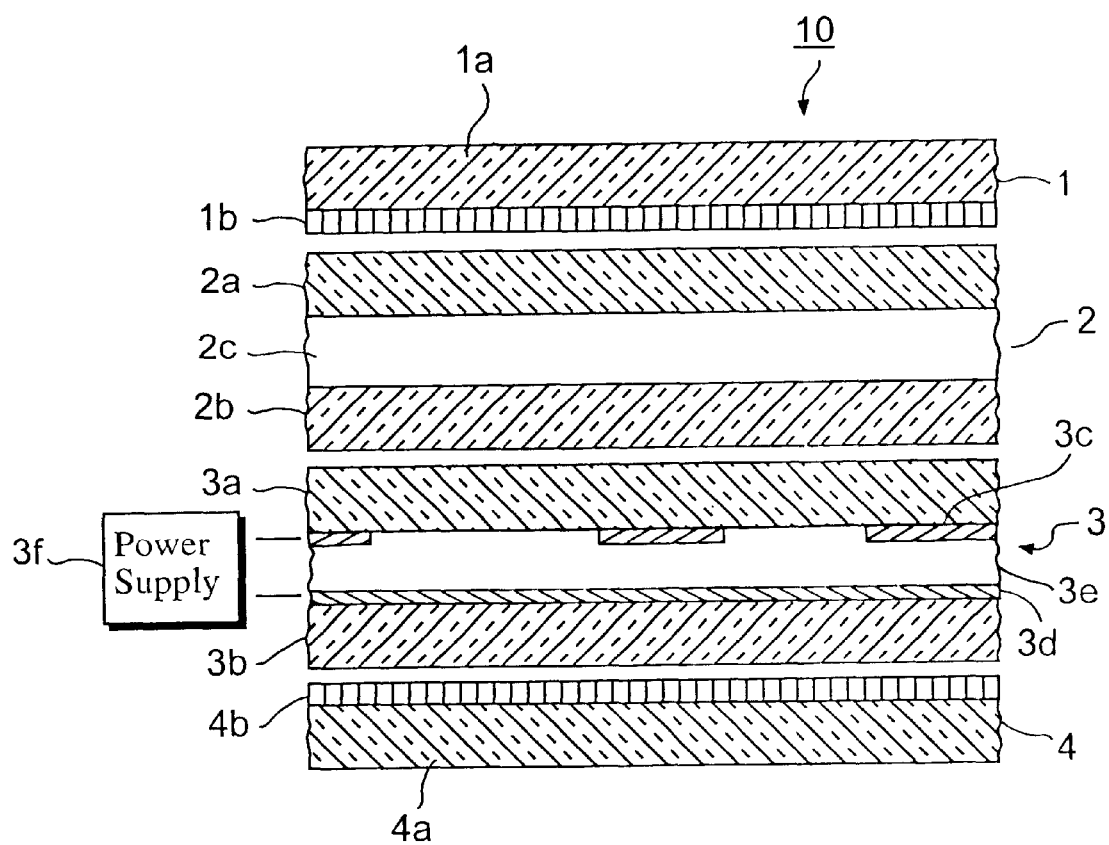
FIG. 1 is a cross-sectional view showing the constitution of embodiment 1 of the invention.

FIGS. 1 and 2 represent the cross-sectional views of the liquid crystal display device in this embodiment. The liquid crystal display device consists of two polarizers 1 and 4 (LLC2-92-18: manufactured by SANRITZ) and the liquid crystal cell 2, which uses a liquid crystal element for viewing angle compensation, and driving liquid crystal cell 3, both held between the polarizers. The polarizer 1 is a transparent substrate 1b inside of which is held a polarizer film 1a, and the polarizer 4 is a similar substrate 4b to which is applied a polarizer film 4a.

The liquid crystal cell 2 for visual angle compensation as an optical anisotropic element is provided between the polarizers 1 and 4, and an optical anisotropic layer 2c interposed between the transparent substrates 2a and 2b.

On the surface of the substrates (2a and 2b), ($SiO_2$ is oblique-evaporated respectively) at different angles, and introduced therebetween is an optical anisotropic substance layer which is a discotic liquid crystal [$C_{18}H_6(OCOC_7H_{15})_6$ with triphenylene core with alkyl chain by ester bond], that introduces as an optical anisotropic substance layer with pretilt angle 30 degrees if nearer to the driving liquid crystal cell, and 60 degrees if far from it. The retardation value Δnd of the optical anisotropic substance layer used for the liquid crystal cell for compensation of viewing angle is −570 nm.

The driving liquid crystal cell 3 which comprises an upper substrate 3a and a lower substrate 3b having respective transparent electrodes 3c and 3d connected to a power supply 3f is arranged between the liquid crystal cell 2 as an optical anisotropic element and the polarizer 4. Between the two substrates 3a and 3b, a twisted nematic liquid crystal layer (ZLI-4287, E. Merck Co., Ltd.) of positive dielectric anisotropy to which is mixed the chiral agent S811 (of E. Merck Co., Ltd.) is filled. The twisted angle of the layer is 90 degree which alters the state in response to the voltage applied from the power supply 3f. The twisted alignment is maintained when no voltage is applied.

The difference Δn of the liquid crystal used for the driving liquid crystal cell is 0.093, the thickness of the liquid crystal layer is 5.5 micron. The molecular liquid crystal of the driving liquid crystal cell 3 is twisted counterclockwise (left twist) from the lower substrate 3b toward the upper substrate 3a. This cell 3 functions as TN cell with 90° twist angle and optically controlled by optical rotatory power.

Figure 2A:
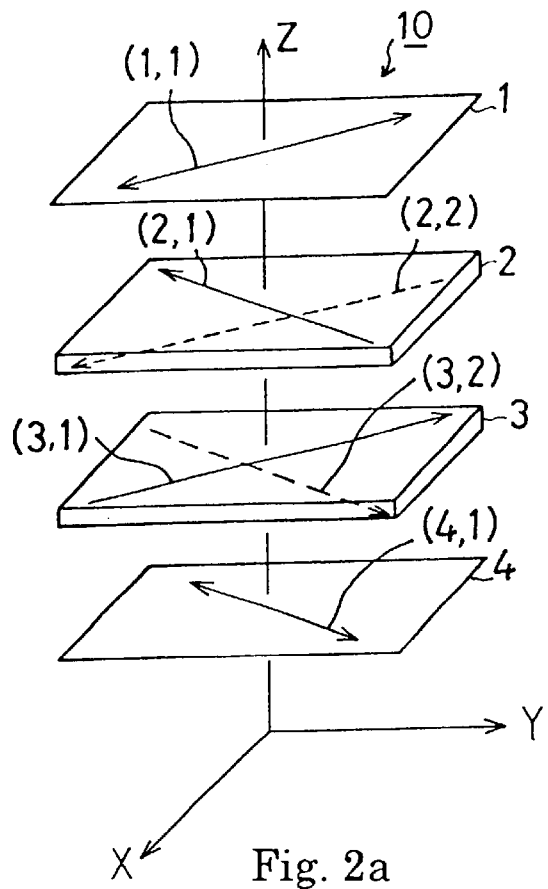
FIG. 2a is an exploded perspective view illustrating the embodiment 1 of the invention and FIG. 2b shows an illustration showing the coordinate system for measuring the electrooptic characteristics.

FIG. 2a is an exploded perspective diagram showing the composition of the liquid crystal display device in this embodiment. (1.1) and (4.1) represent, respectively, the transmission axes of the polarizers 1 and 4, which are orthogonal (1.1) with each other and arranged at 135° counterclockwise viewed from the +Z direction which is the normal direction of the substrate to the Y axis. (3.1) and (3.2) are the rubbing axes; namely, alignment directions of the upper substrate 3a and lower substrate 3b of the driving liquid crystal cell 3, which are orthogonal with each other and arranged at an angle 45° between Y axis and rubbing axis (3.1) counterclockwise viewed from the +Z direction The optical anisotropic elements (2.1) and (2.2) of the liquid crystal cell 2 for viewing angle compensation are the rubbing axes of the upper and lower substrates 2a and 2b respectively, which are orthogonal with each other, and the liquid crystal cell for visual angle compensation 2 is so arranged that the rubbing axis (2.2) is parallel to the rubbing axis (3.1) of the driving liquid crystal cell 3. That is, the optical axis OL (FIG. 6) of the molecular liquid crystal LM is placed along these rubbing axes to be the optical axes of the liquid crystal layer on the side on which the liquid crystal layer comes in contact with the rubbed face of the substrate.

The polarizer 1 has been so arranged that the transmission axis (1.1) is perpendicular with the rubbing axis (2.1) of the liquid crystal cell 2 for viewing angle compensation as an optical anisotropic element.

Figure 2B:
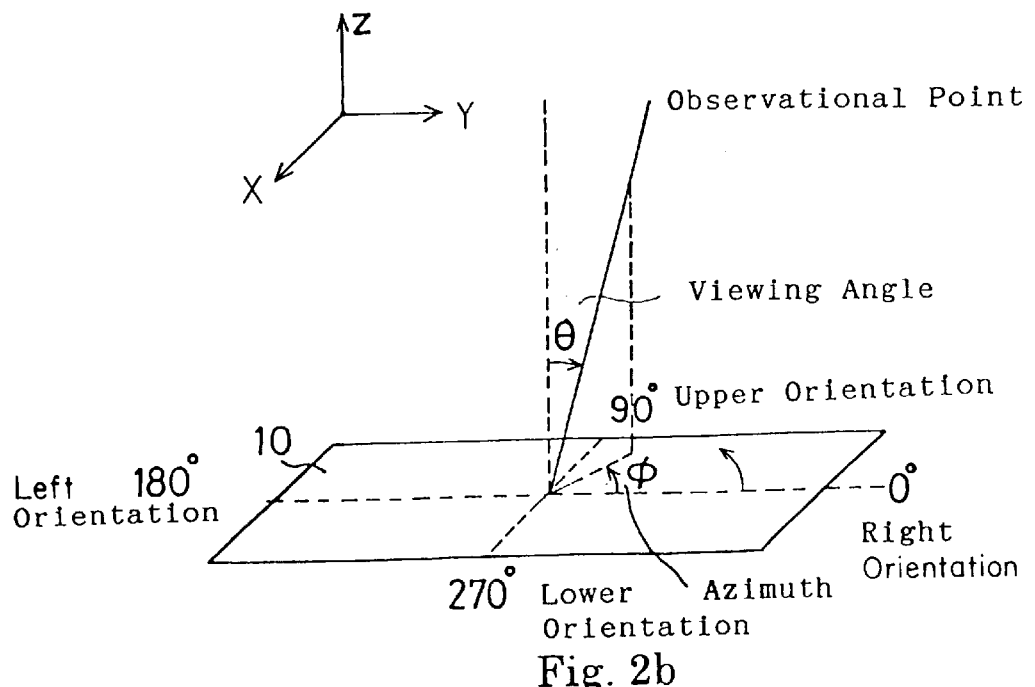
Figure 11:
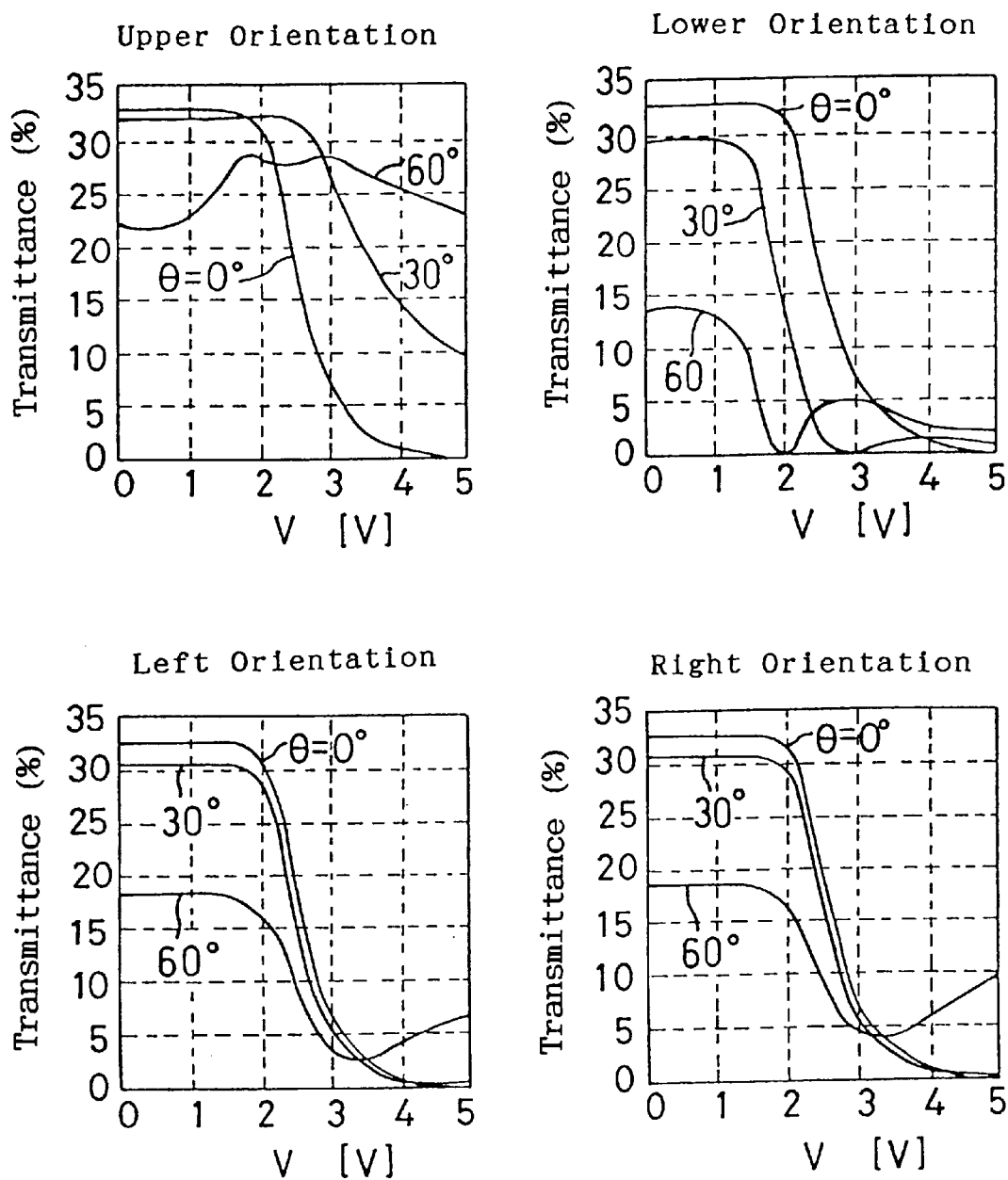
FIG. 11 contains graphs for showing the electrooptic characteristics of the liquid crystal display device by comparison example 1.

The electrooptic characteristics of the liquid crystal cell display device of the present constitution were measured in the coordinate system as shown in FIG. 2b. The voltage in the measurement (voltage to be applied between the electrodes 3c and 3d of the driving liquid crystal cell 3 from the drive power supply 3f) was varied from 1 v to 5 V. The results of this measurement are shown in FIG. 11. This figure, which shows the applied voltage-transmittance in four orientations (up and down, right and left) indicating the transmittance when the viewing angle is varied from front face to 60° by 30°. Ideally the transmittance should be identical with the transmittance curve at the frontal face (visual angle θ=0°) at any viewing angle. In the frontal direction, the transmittance reduces with the increase of voltage when a certain voltage is exceeded.

Figure 10:
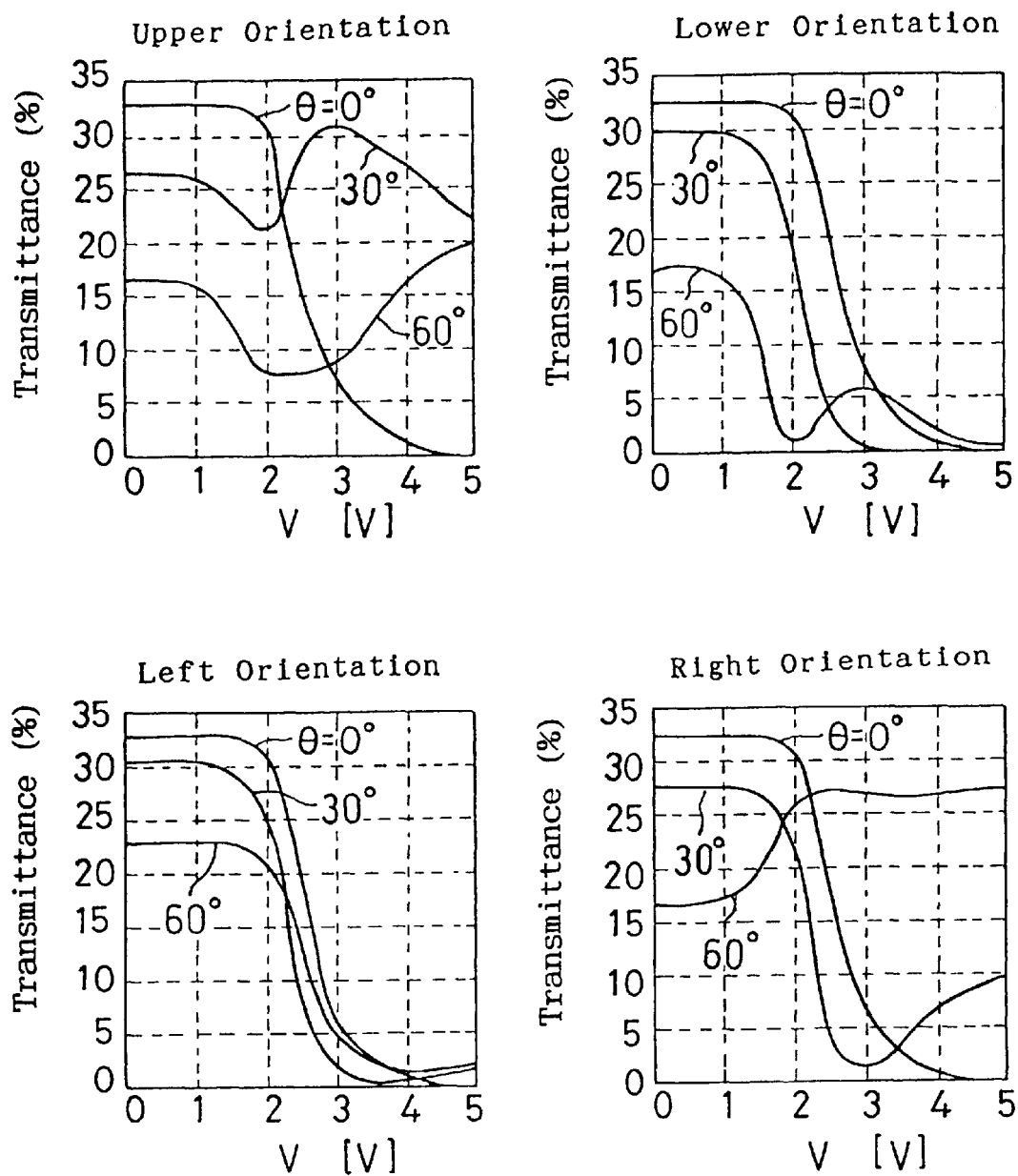
FIG. 10 contains graphs for showing the electrooptic characteristic of the liquid crystal display device in embodiment 1.

In this embodiment, it is understood, with reference to FIG. 10, that the characteristic in the lower orientation hardly changes, that in right and upper orientation worsens and that only in the left orientation is improved with "reversing" at 60 degrees of visual angle reduced.

Such a characteristic is available when the viewing angle only in a particular direction is to be improved as in the cases of a car navigation system or private information terminal.

COMPARISON EXAMPLE 1

In the first embodiment we measured the voltage-transmittance characteristic when there existed no liquid crystal cell 2 for visual angle compensation. The results of this measurement are shown in FIG. 11. This comparison example revealed a phenomenon that the display brightens in the upper orientation and it darkens or the gradation reverses in the lower orientation, both depending on the angle.

EMBODIMENT 2

Figure 12:
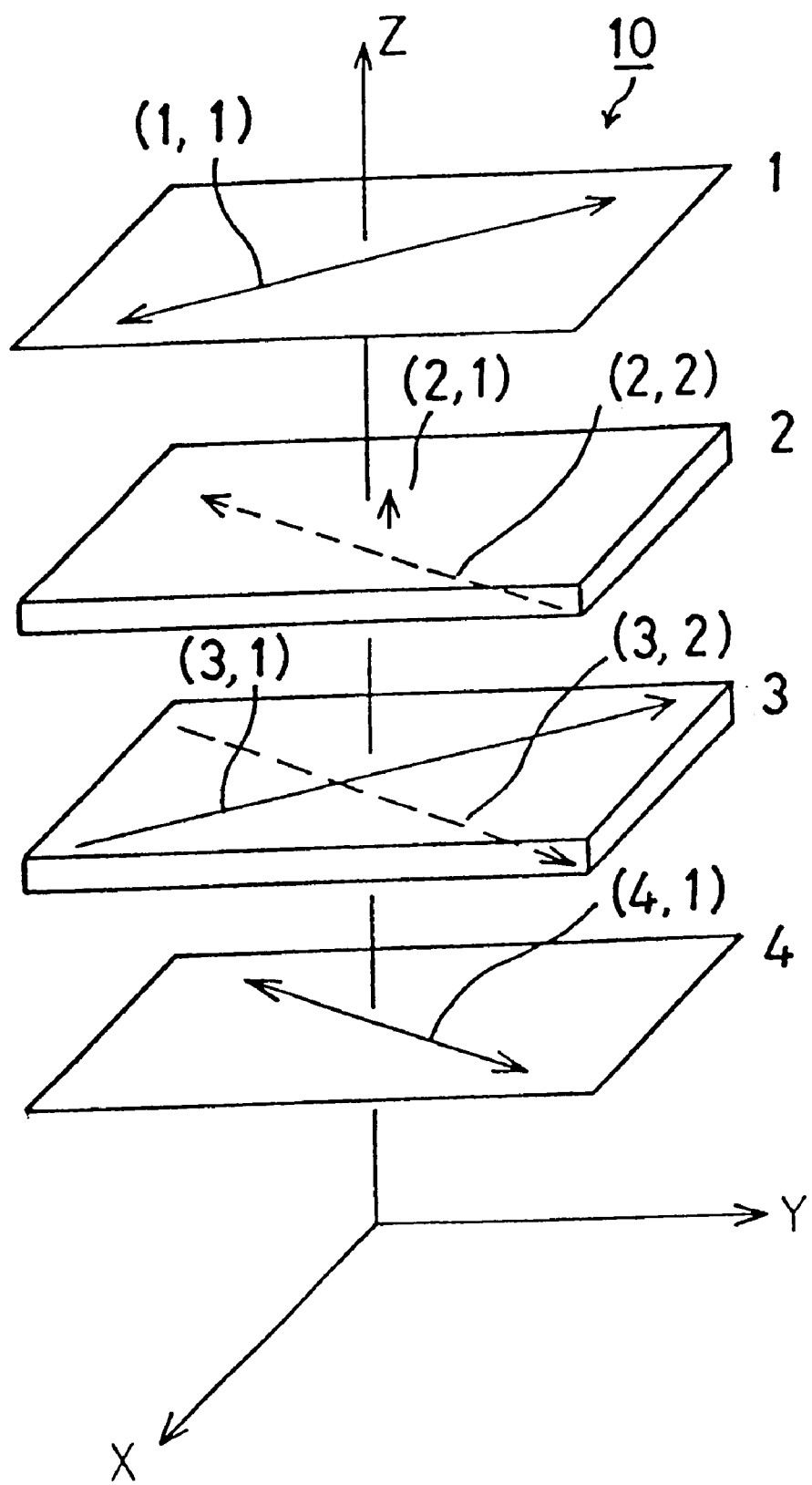
FIG. 12 is an exploded perspective view illustrating the constitution of embodiment 2 according to this invention.

FIG. 12 is an exploded perspective diagram showing the constitution of the liquid crystal display device in the second embodiment. In embodiment 1, polyimide AL-1051 (manufactured by Japan Synthetic Rubber Co., Ltd.) is applied on both sides of the lower substrate 2b contacting with the liquid crystal cell 2 for visual angle compensation which is an optical anisotropic element. The surface of this coating is processed by rubbing. The pretilt angle is 1° in this case. On the other hand, vertical alignment is processed on the side contacting with liquid crystal of the upper substrate 2a. The differential Δn is 0.039, and the thickness of the liquid crystal layer is 4.4 micron. The optical axis of the liquid crystal molecule, namely that of the optical anisotropic element runs parallel on the side of the driving liquid crystal cell 3 and goes substantially along the normal of the cell substrate on the side isolated from the liquid crystal cell 3 continuously changing in the direction of the layer thickness. The twist angle is 0°.

(1.1) and (4.1) are the transmission axes of polarizers 1 and 4 respectively, which run orthogonal to each other, and (1.1) is arranged at 135° to the Y axis viewed counterclockwise from +Z direction. (3.1) and (3.2) are the rubbing axes of the upper and lower substrates 3a and 3b for the liquid crystal cell 2 for visual angle compensation which run orthogonal to each other and arranged at an angle of 45° with the rubbing axis (3.1) to the Y axis viewed counterclockwise from the +Z direction.

The optical axis (2.2) of the liquid crystal cell 2 for visual angle compensation is the rubbing axis of the lower substrate 2b, which runs orthogonal to the rubbing axis (3.1) of the upper substrate for the driving liquid crystal cell 3 to be parallel with the rubbing axis (3.2) of the lower substrate.

The transmission axis (1.1) of the polarizer 1 has been provided parallel to the rubbing axis (3.1) of the upper substrate for the driving liquid crystal cell 3.

Figure 13:
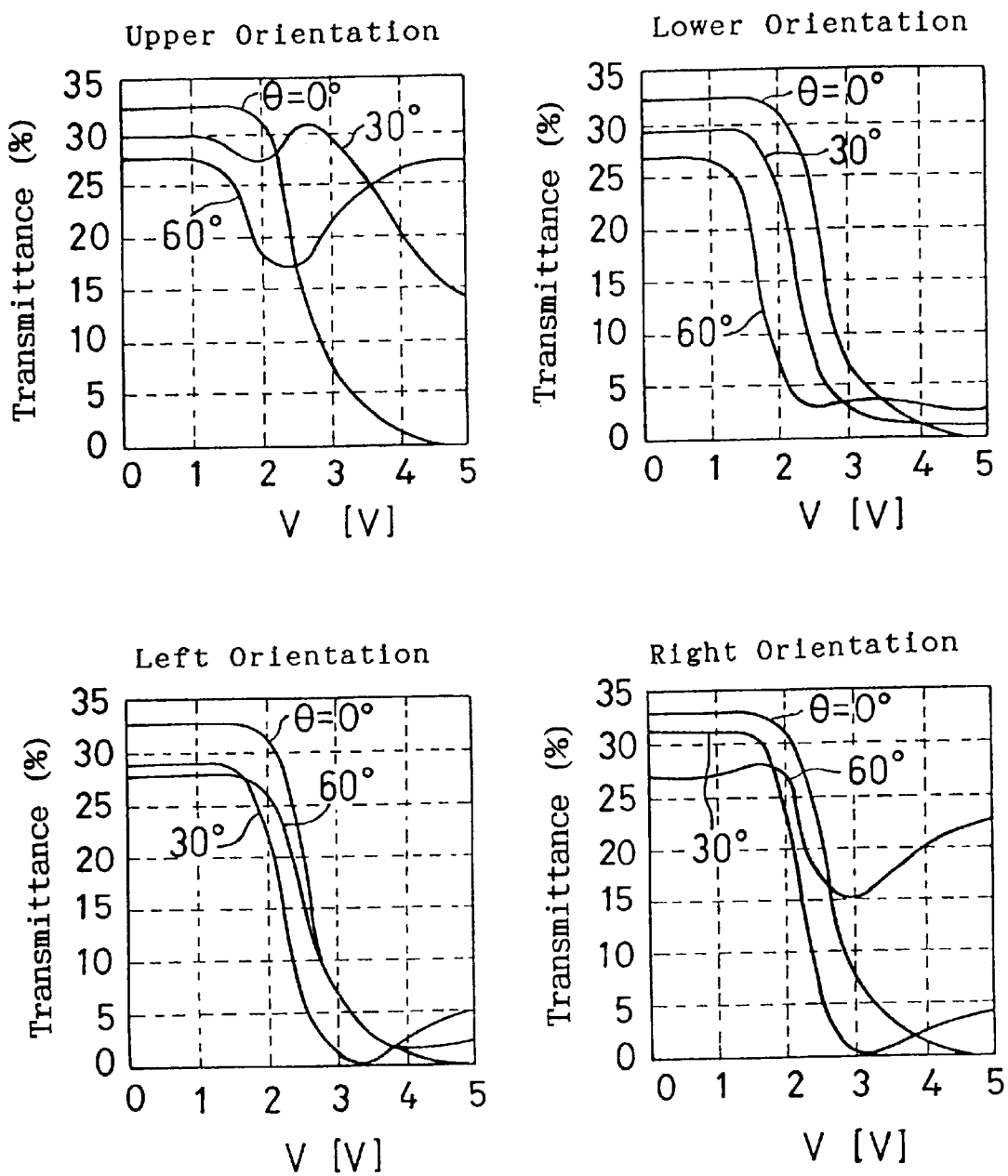
FIG. 13 contains graphs showing the electrooptic characteristics in comparison example.

The electrooptic characteristics of the liquid crystal cell display device of the present constitution were measured in the coordinate system as shown in FIG. 2b. The voltage in the measurement (voltage to be applied between the electrodes 3c and 3d of the driving liquid crystal cell 3 from the drive power supply 3f) was varied from 1 V to 5 V. The result of these measurements are shown in FIG. 13.

As is clear from the comparison with the characteristic diagram 11 in the conventional example, the viewing angle worsens in the upper and right orientations, but the "reversing" nearly vanishes in the lower orientation, and the contrast of 60 degrees of visual angle is improved in the left orientation.

EMBODIMENT 3

Figure 14:
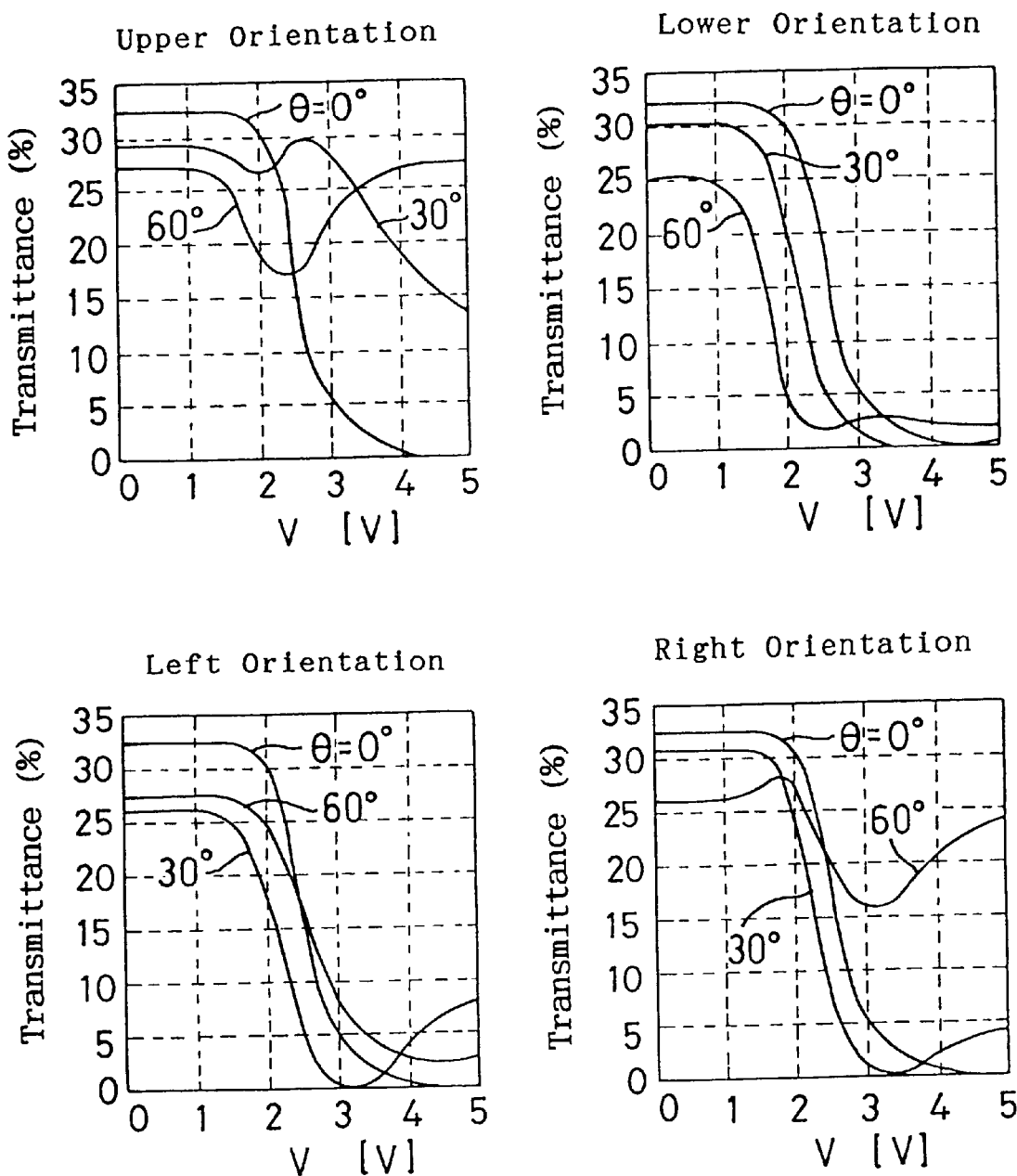
FIG. 14 contains graphs showing the effects of embodiment 3 of this invention.

In Embodiment 2, the liquid crystal layer of the liquid crystal cell for compensation of visual angle 2 was put into twisted alignment with 10 degrees of twist angle. The twist direction is counterclockwise (left twist) from the lower substrate 2b toward the upper substrate 2a. Any other conditions are exactly the same as in the Embodiment 2. FIG. 14 shows the voltage-transmittance characteristic. Though no great difference is shown from Embodiment 2 due to the twist angle of 10 degrees, the reversing in right and left orientation increases due to the twist applied to the liquid crystal cell for compensation of viewing angle, thereby improving the contrast in the lower orientation.

EMBODIMENT 4

Figure 15:
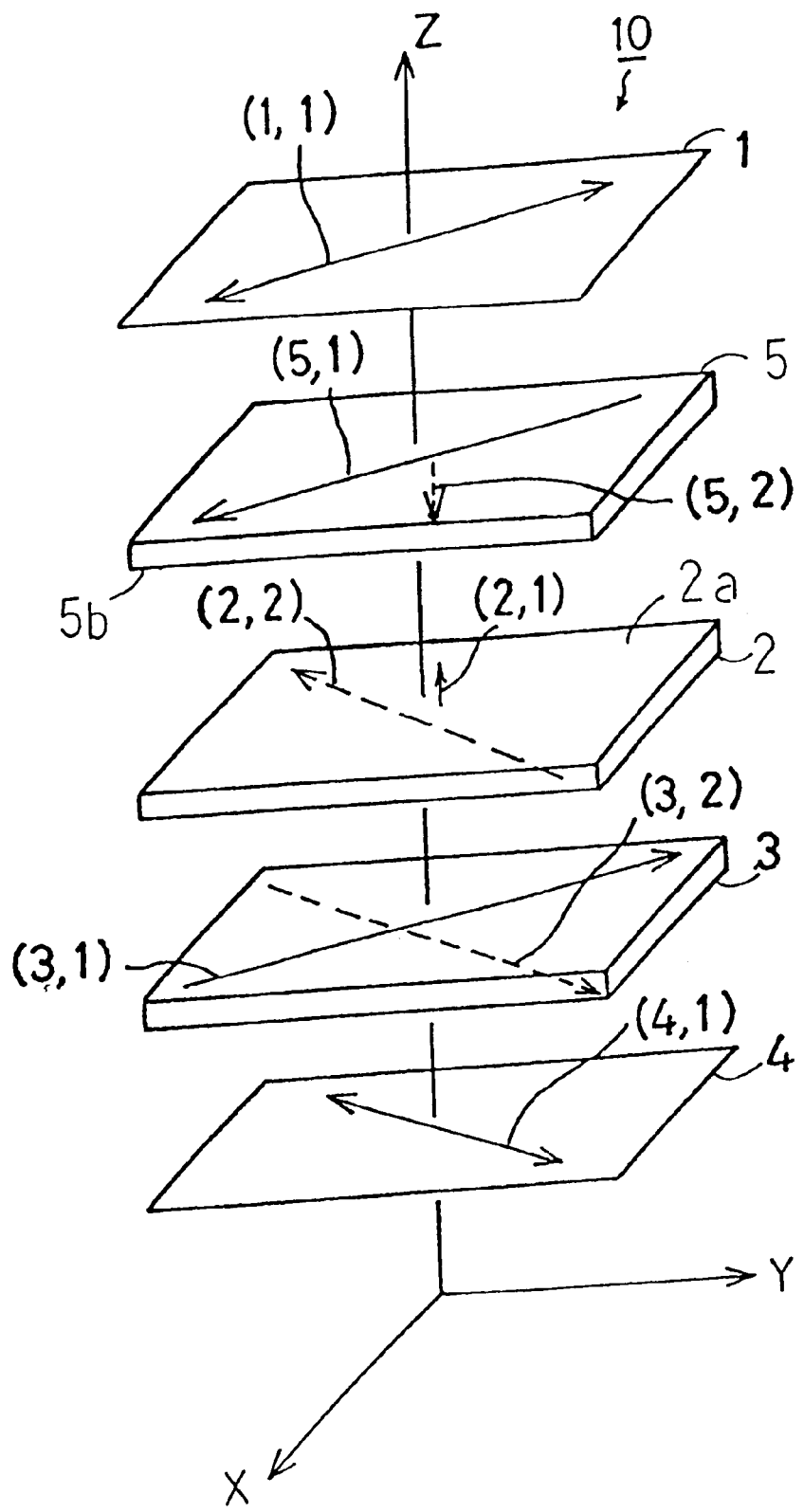
FIG. 15 is an exploded perspective view showing the configuration of embodiment 4 of this invention.

FIG. 15 is an exploded perspective view showing the configuration of the liquid crystal display device in this embodiment. The liquid crystal cell for compensation of visual angle 2, which is the first optical anisotropic element, is same as the liquid crystal cell for compensation of visual angle 2 in Embodiment 2.

The liquid crystal cell for compensation of visual angle 5, which is the first optical anisotropic element, is of the construction of the liquid crystal cell for compensation of visual angle 2, which is however vertically inverted. Polyimide AL-1051 (of Japan Synthetic Rubber Co., Ltd.) is applied on the side of the plane where the lower substrate 2b of the liquid crystal cell for compensation of viewing angle 2 and the upper substrate 5a of the liquid crystal cell for compensation of viewing angle 5 come in contact with the liquid crystal, and the rubbing is performed on this polyimide. The pretilt angle is 1 degree. On the other hand, a homeotropic alignment is processed on the side where the lower substrate 2a of the liquid crystal cell for compensation of viewing angle 2 and the upper substrate 5b of the liquid crystal cell for compensation of viewing angle 5 come in contact with the liquid crystal.

The differential Δnd of the cell for compensation of viewing angle is −570 nm for both cells. The optical axis of the liquid crystal molecule, that is, the optical axis of the optical anisotropic element is parallel to the cell substrate surface on the side near to the driving liquid crystal cell of the liquid crystal for compensation of viewing angle 2 and varies continuously in the direction of the layer thickness to go substantially along the direction of the normal to the cell substrate on the side isolated from the liquid crystal cell 4 and reverse to this for cell 5 . The twist angle is 0 degree for both cells.

(1.1) and (4.1) are the transmission axes of the polarizers 1 and 4, which run orthogonal to each other and are arranged at 135 degrees counterclockwise as viewed from the +Z direction against the Y axis. (3.1) and (3.2) are the rubbing axes of the upper and lower substrates 3a and 3b of the driving liquid crystal cell 3, which run orthogonal to each other and the angle between the Y axis and the rubbing axis (3.1) is arranged at 45 degrees counterclockwise as viewed from the +Z direction.

The optical axis (2.2) of the liquid crystal cell for compensation of viewing angle 2 is the rubbing axis of the lower substrate 2b, which is so arranged that it goes orthogonal with the rubbing axis (3.1) of the upper substrate of the driving liquid crystal cell 3 and parallel to the rubbing axis (3.2) of the lower substrate.

The optical axis (5.1) of the liquid crystal cell for compensation of viewing angle 5 is the rubbing axis of the upper substrate 5a, which is so arranged that it goes orthogonal with the rubbing axis (3.1) of the upper substrate of the driving liquid crystal cell 3 and parallel to the rubbing axis (3.1 ) of the lower substrate.

The transmission axis (1.1) of the polarizer 1 has been so arranged that it runs parallel to the rubbing axis (3.1) of the upper substrate of the driving liquid crystal cell 3.

Figure 16:
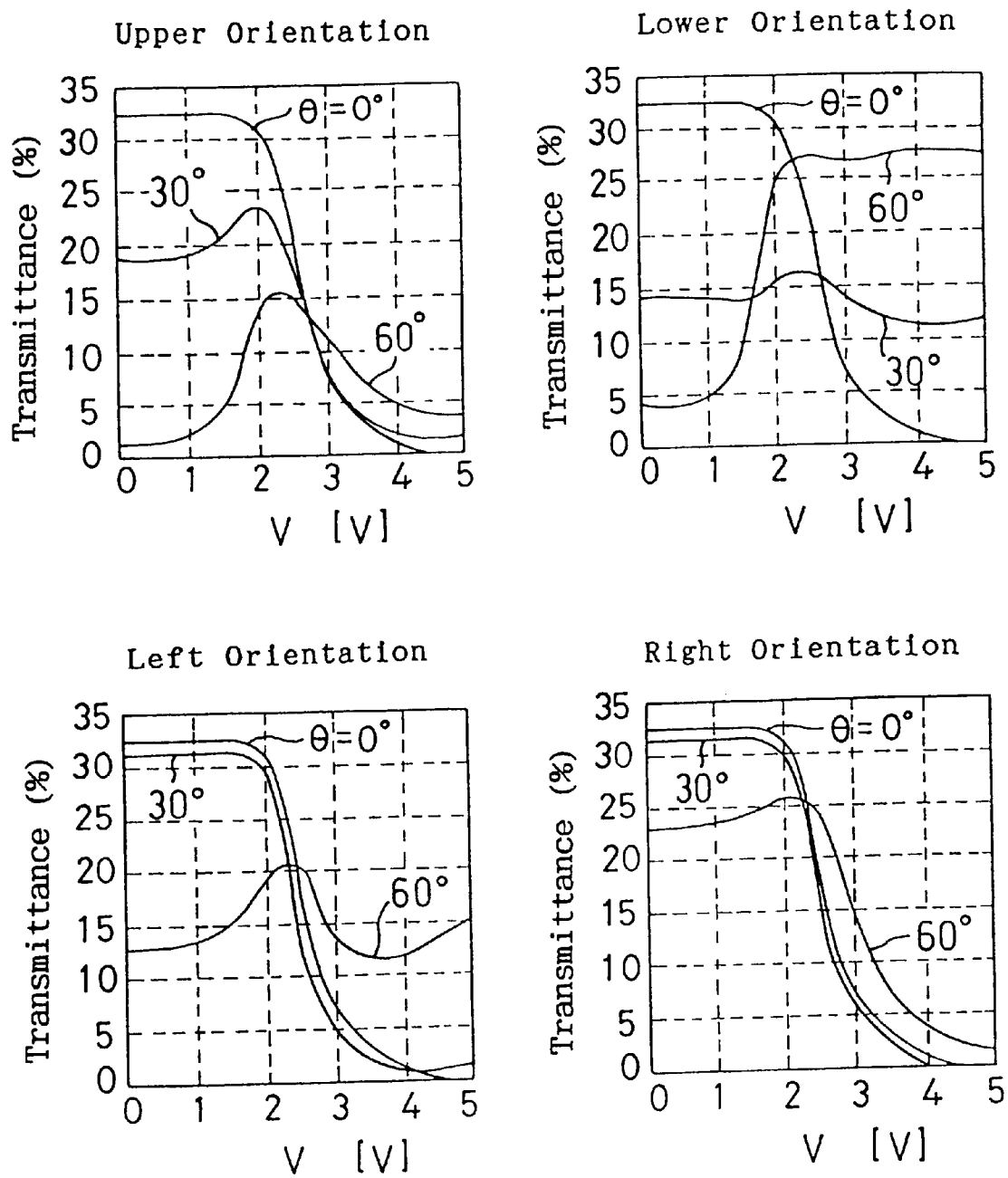
FIG. 16 contains graphs showing the effects of embodiment 4 of this invention.

The electrooptic characteristic of the liquid crystal display device by this configuration was measured on the coordinate system as shown in FIG. 2(*b*). The voltage at the measurement (voltage to be applied between the electrodes 3c and 3d of the driving liquid crystal cell 3 from the drive supply source 3f) was changed from 1 V to 5 V. FIG. 16 shows the results of this measurement. Compared with the characteristic diagram FIG. 11 in the conventional example, the characteristic in left and lower orientation has worsened, but the "reversing" has vanished in the right orientation and the "excessive bright image" in the upper orientation has been improved.

EMBODIMENT 5

Figure 17:
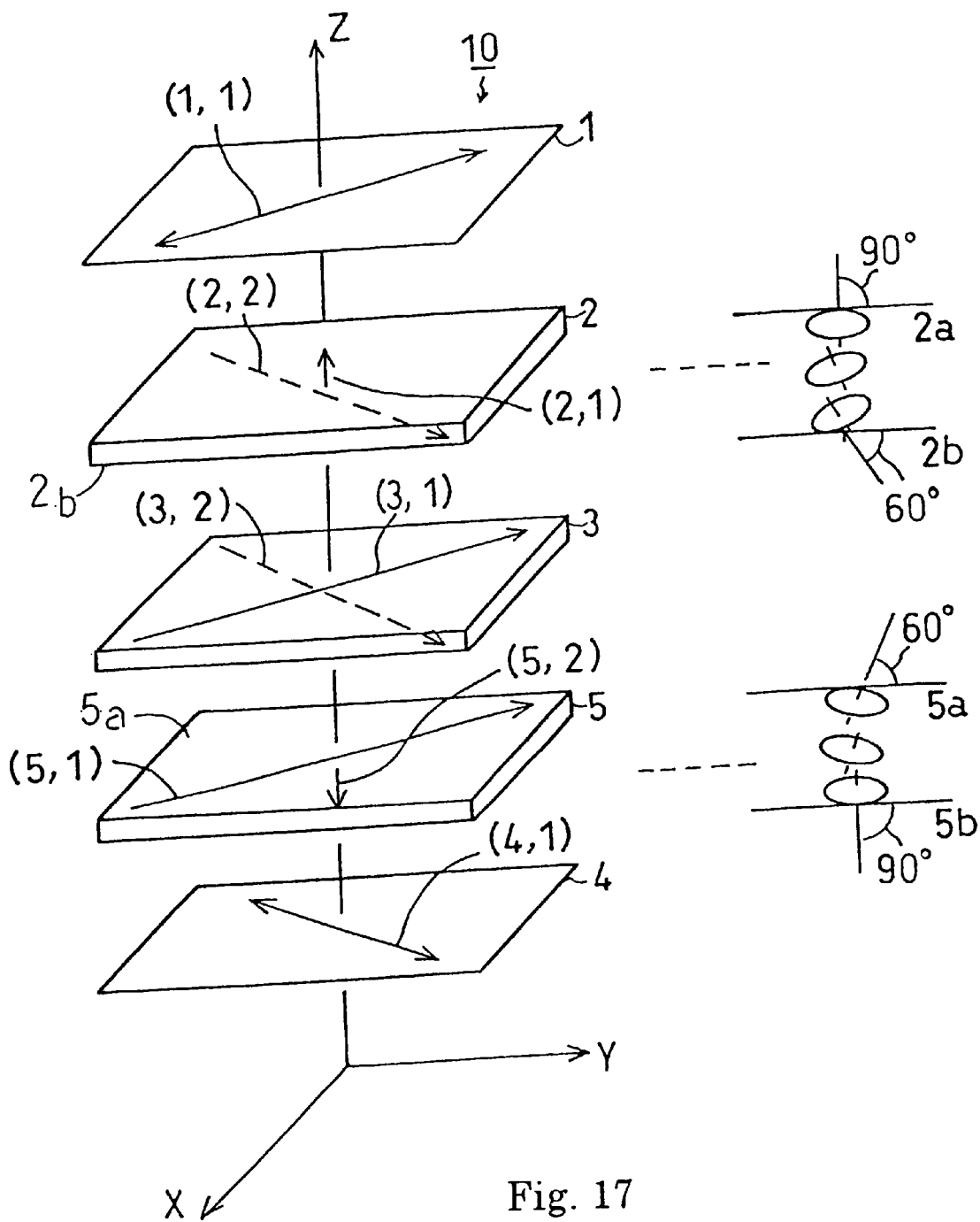
FIG. 17 is an exploded perspective view showing the configuration of embodiment 5 of this invention.

FIG. 17 is an exploded perspective view showing the configuration of the liquid crystal display device in this embodiment. The liquid crystal cell for compensation 2, which is the first optical anisotropic element, resembles in its structure the liquid crystal cell for compensation 2 in Embodiment 2, provided however that SiO2 is obliquevaporized on one side of substrate. The pretilt angle of the lower substrate is 60 degrees. Homeotropic alignment has been processed on the side of the upper substrate 2a which comes in contact with the liquid crystal.

The liquid crystal cell for compensation of viewing angle 5 which is the second optical anisotropic element has the structure of the liquid crystal cell for compensation of viewing angle 2, which however is vertically inverted. The differential Δnd of the cell for compensation of viewing angle is −180 nm for both cells. The tilt angle is 0 degree for both cells.

(1.1) and (4.1) are the transmission axes of the polarizers 1 and 4, which run orthogonal to each other and (1.1) is arranged at 135 degrees counterclockwise as viewed from the +Z direction against the Y axis. (3.1) and (3.2) are the rubbing axes of the upper and lower substrates 3a and 3b of the driving liquid crystal cell 3, which run orthogonal to each other and the angle between the Y axis and the rubbing axis (3.1) is arranged at 45 degrees counterclockwise as viewed from the +Z direction.

The optical axis (2.2) of the liquid crystal cell for compensation of viewing angle 2 is so arranged that it runs orthogonal with the rubbing axis (3.1) of the upper substrate of the driving liquid crystal cell 3 and parallel to the rubbing axis (3.2) of the lower substrate in the alignment direction of the substrate 2b.

The optical axis (5.1) of the liquid crystal cell for compensation of viewing angle 5 is so arranged that it goes orthogonal with the rubbing axis (3.1) of the upper substrate of the driving liquid crystal cell 3 and parallel to the rubbing axis (3.2) of the lower substrate in the alignment direction of the lower substrate 2b.

The transmission axis (1.1) of the polarizer 1 has been so arranged that it runs parallel to the rubbing axis (3.1) of the upper substrate of the driving liquid crystal cell 3.

Figure 18:
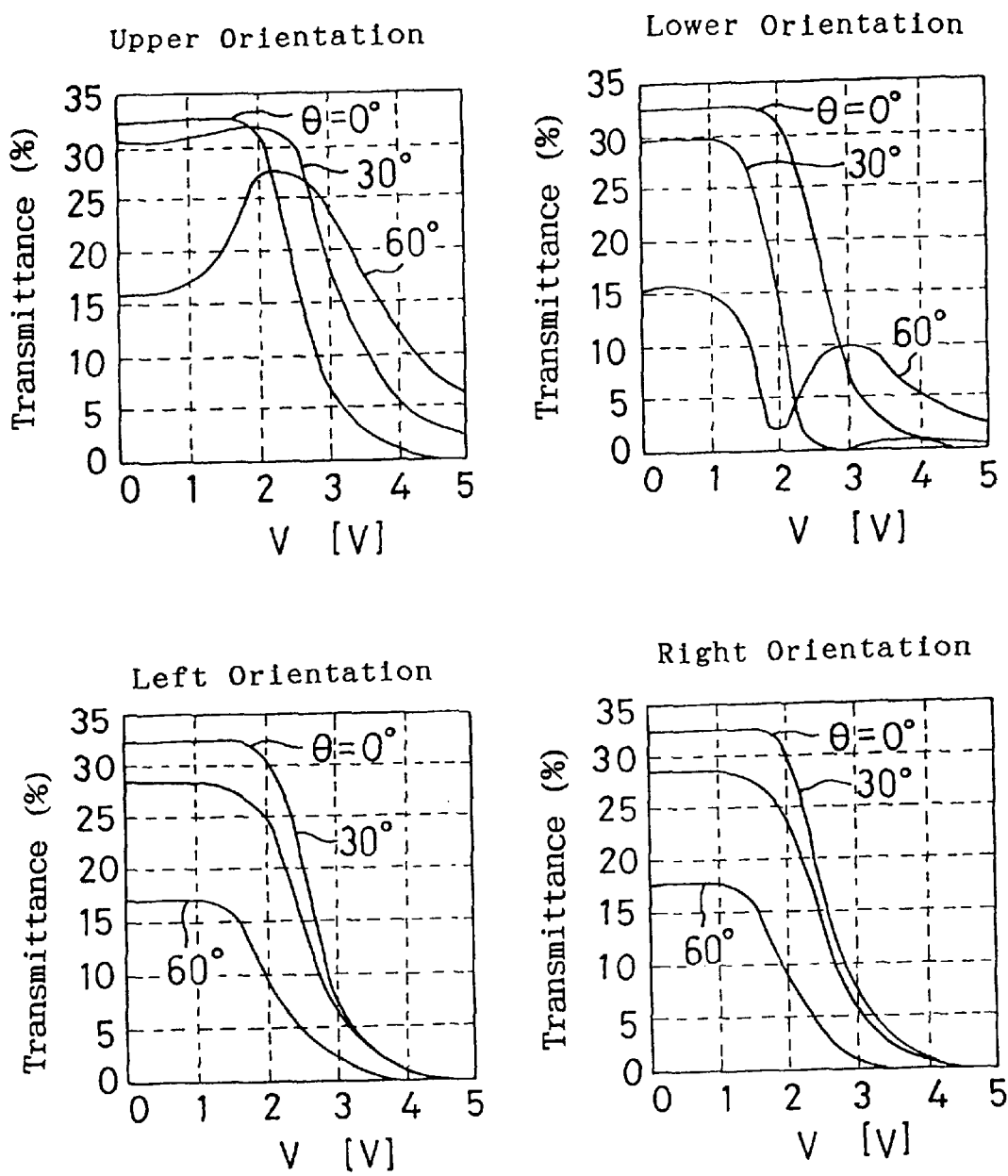
FIG. 18 contains graphs showing the effects of embodiment 5of this invention.

The electrooptic characteristic of the liquid crystal display device by this configuration was measured on the coordinate system as shown in FIG. 2(*b*). The voltage at the measurement (voltage to be applied between the electrodes 3c and 3d of the driving liquid crystal cell 3 from the drive supply source 3f) was changed from 1 V to 5 V. FIG. 18 shows the results of this measurement. Compared with the characteristic diagram FIG. 11 in the conventional example (Comparative Example 1), the "reversing" in the lower orientation has worsened, but the "reversing" has vanished in the right and left orientation and the "excessive bright image" in the upper orientation has been much improved.

EMBODIMENT 6

Figure 19:
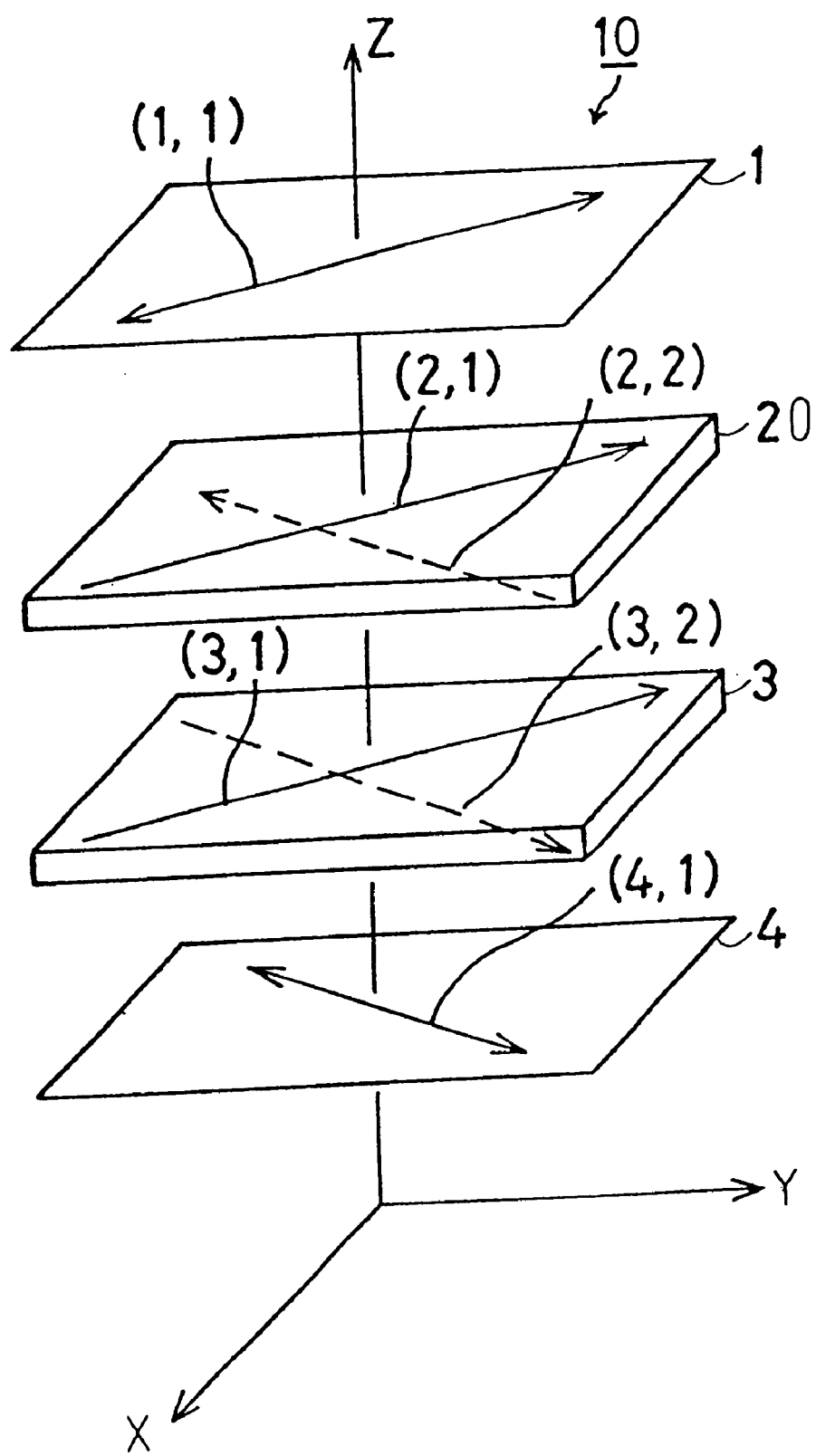
FIG. 19 contains graphs showing the effects of embodiment 6of this invention.

FIG. 19 is an exploded perspective view showing the configuration of the liquid crystal display device in this embodiment. The liquid crystal cell for compensation of viewing angle, which is an optical anisotropic element in this embodiment, consists of two optical anisotropic layers, that are no other than superposed cells 2 and 5 for compensation of viewing angle in Embodiment 4. The differential Δnd is −380 nm.

Figure 20:
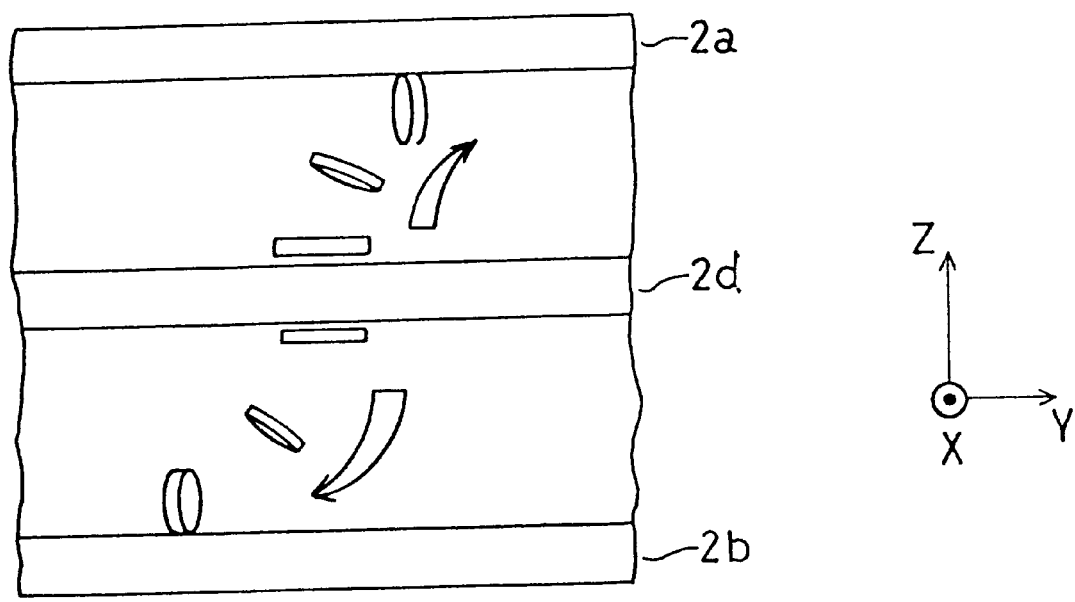
FIG. 20 is a schematic cross sectional view showing the configuration of a liquid crystal cell for compensation of viewing angle of embodiment 6 of this invention.

FIG. 20 is a cross sectional view of liquid crystal cell 2 for compensation of viewing angle as an optical anisotropic alignment as viewed from the direction of the +X axis. With the substrate 2d vertically aligned (homeotropic) on both sides as boundaries, the direction of optical axis as viewed from the +Z axis is that of the rubbing axis (2.1) in the cell 2 shown in FIG. 17 between upper substrates 2a and 2e, and (2.2) between the lower substrates 2d and 2b. If these rubbing axes (2.1) and (2.2) are placed in the same direction, the optical axis will lie on a single axis. If they are placed in different directions, there will be two optical axes, as shown in this embodiment. The optical axes will change continuously if the liquid crystal layer is twisted.

The electrooptic characteristic of the liquid crystal display device by this configuration was measured on the coordinate system as shown in FIG. 2(*b*). The voltage at the measurement (voltage to be applied between the electrodes 3c and 3d of the driving liquid crystal cell 3 from the drive supply source 3f) was changed from 1 V to 5 V. Compared with the characteristic diagram FIG. 11 in the conventional example, the "reversing" and "excessive dark image" in the lower orientation is improved, but there is substantially no change in any other orientations.

Several sheets of the optical anisotropic elements by this invention, as shown in Embodiment 4, give the same characteristics as those of the optical anisotropic elements used in this embodiment. Further, the bend and bend-twist alignments of the liquid crystal with negative optical anisotropy make it possible to manufacture an optical anisotropic element consisting of an optical anisotropic layer.

EMBODIMENT 7

Figure 21:
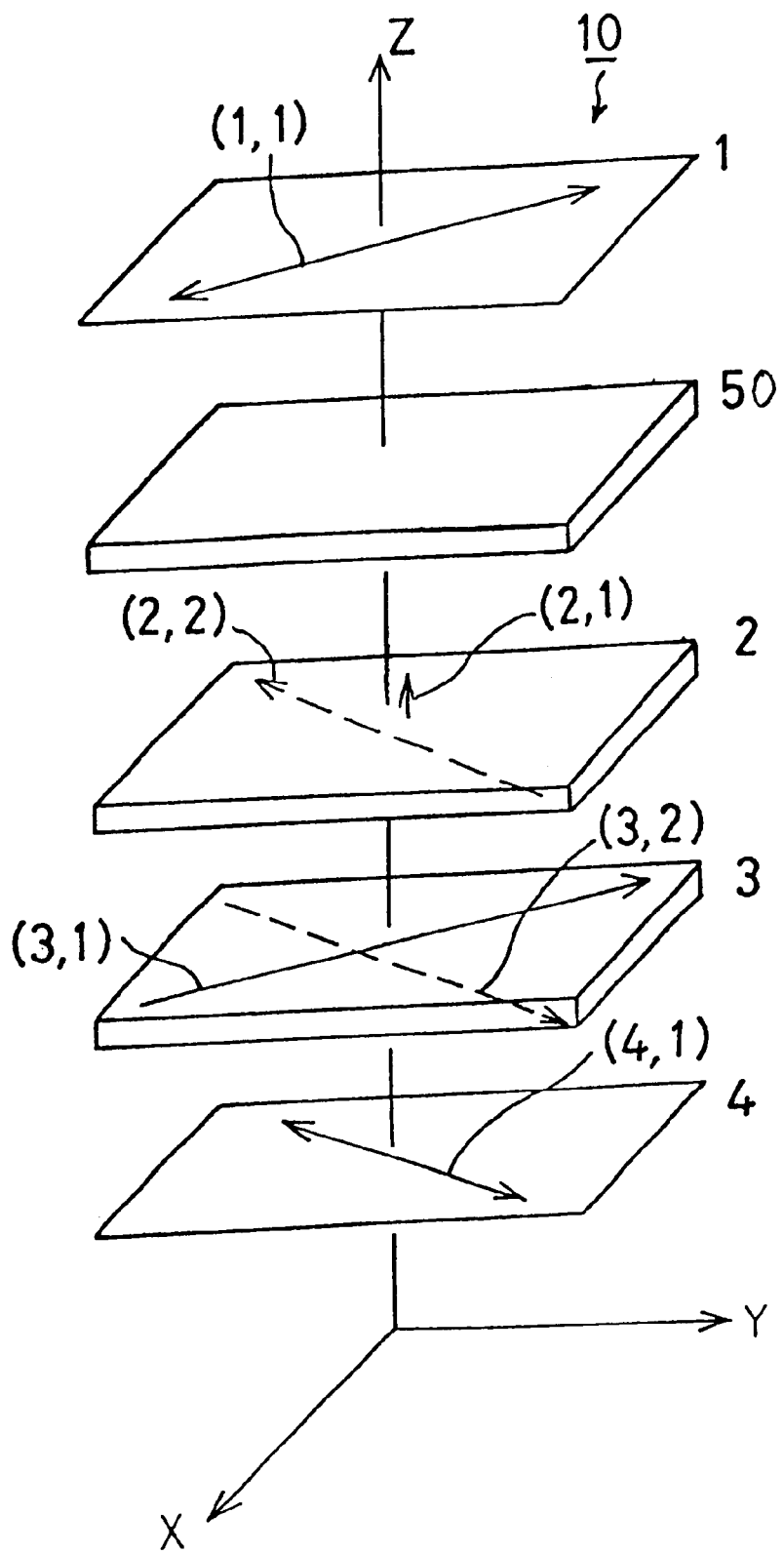
FIG. 21 is an exploded perspective view showing the configuration of embodiment 7 of this invention.

FIG. 21 illustrates the configuration of this embodiment. A biaxial phase difference film 50 is provided between the driving liquid crystal cell 3 and the liquid crystal cell for compensation of viewing angle 2, which is the first optical anisotropic element in Embodiment 2, to compensate for the optical anisotropy with unstable discotic alignment. Though no remarkable improvement is obtained from a characteristic viewpoint, an irregular display due to poor alignment is dissolved.

EMBODIMENT 8

Manufacturing, in Embodiment 2, of a high molecular copolymer, in which the polysiloxane principal chain includes the liquid crystal cells 2 and the side chains, are a suitable proportion of biphenyl benzoate and cholesteryl group, revealed the characteristics similar to those in Embodiment 2. Preparing an optical anisotropic element from high molecular copolymer allows one to realize a thinner liquid crystal display device.

EMBODIMENT 9

Figure 22:
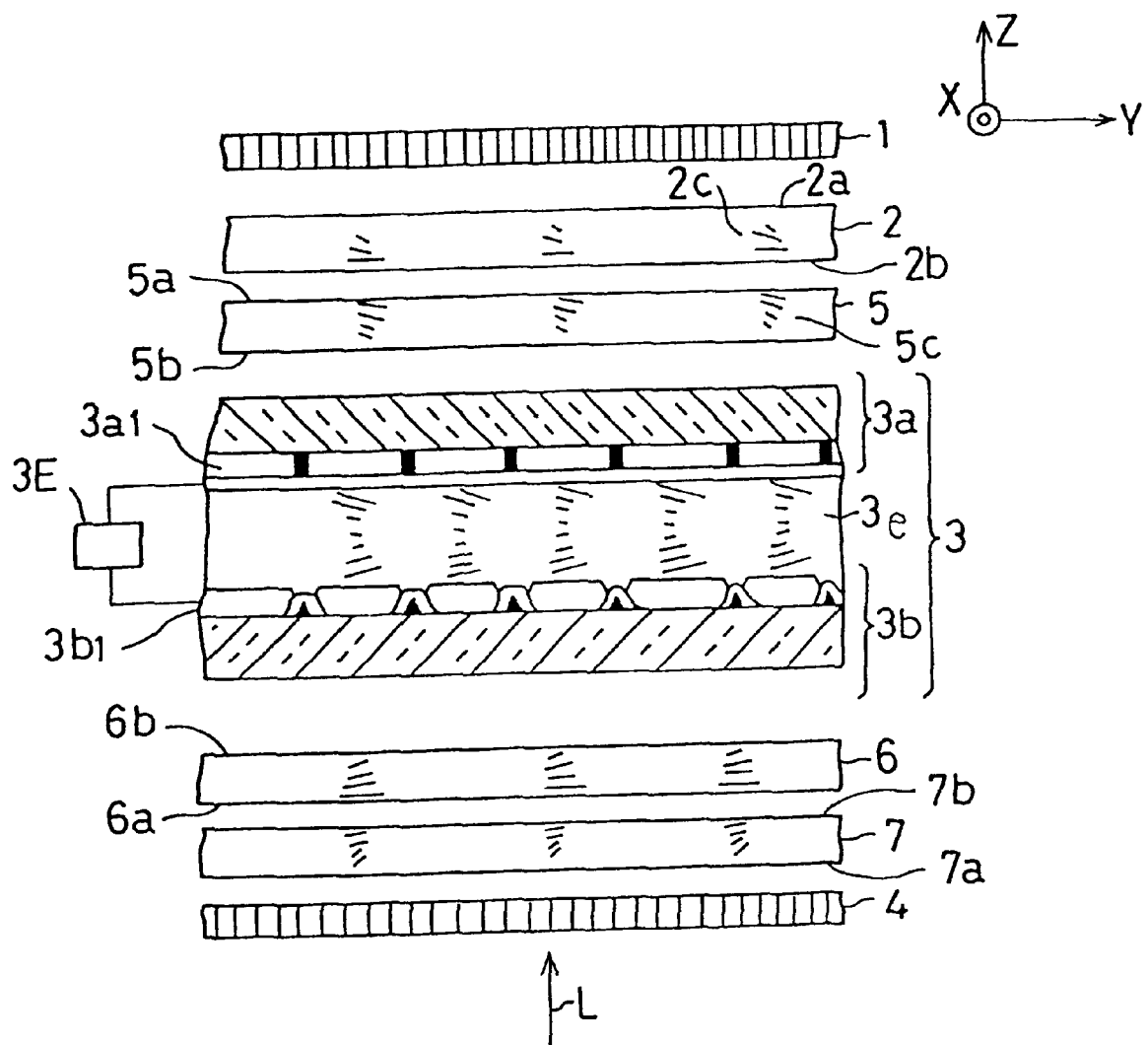
FIG. 22 is a cross sectional view illustrating the constitution of embodiment 9.
Figure 23:
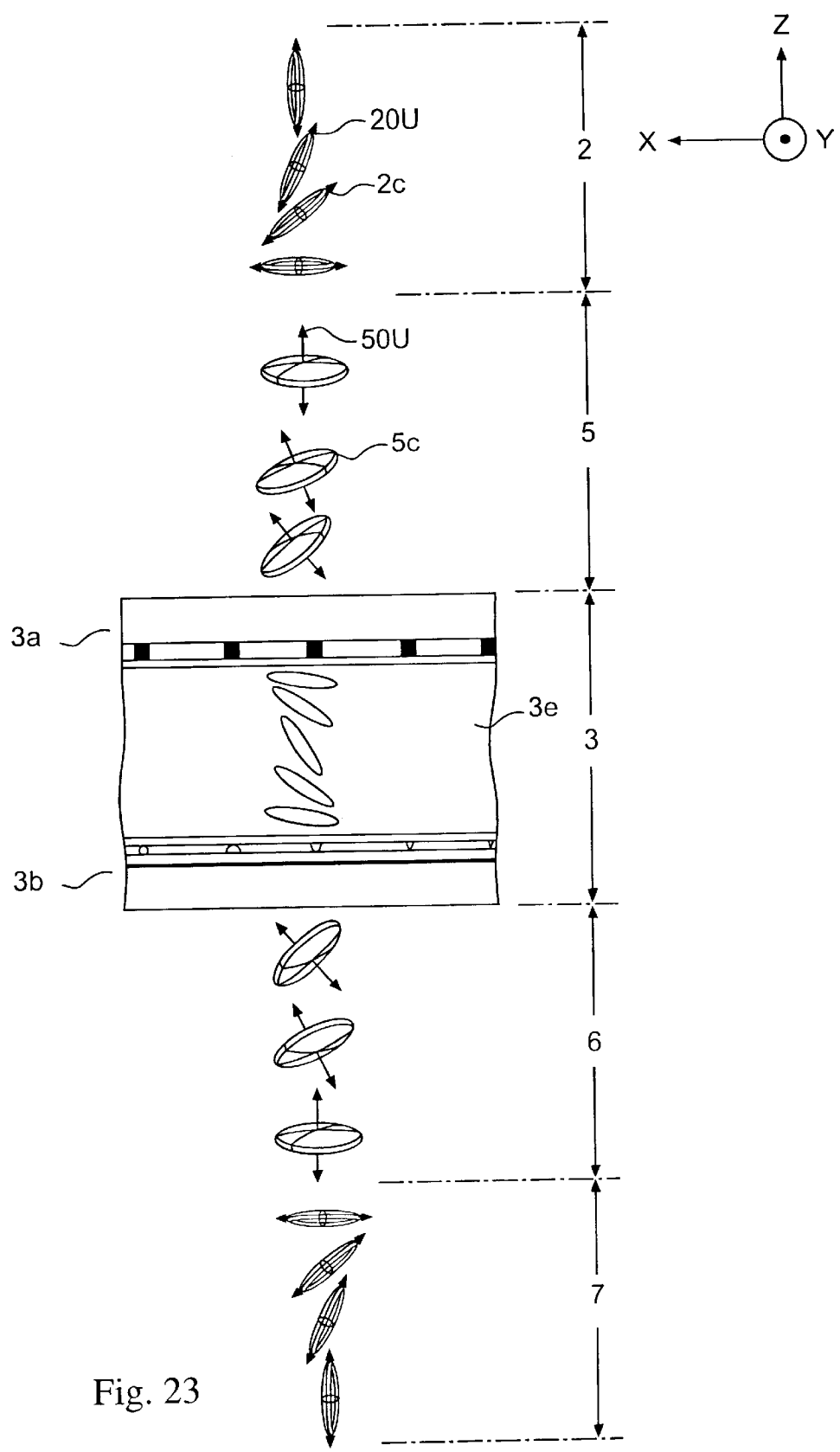
FIG. 23 is a schematic diagram illustrating the function of embodiment 9.
Figure 24D:
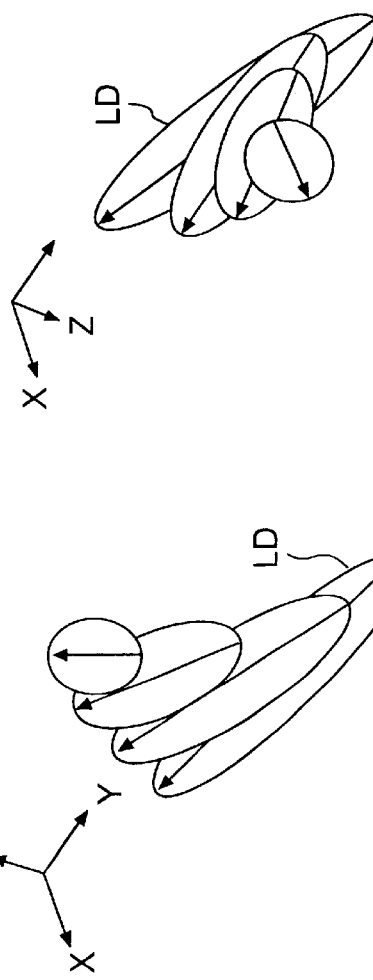
FIG. 24a through FIG. 24d are schematic diagrams illustrating the alignment of the optical axes of the optical anisotropic element relating to this invention.
Figure 24B:
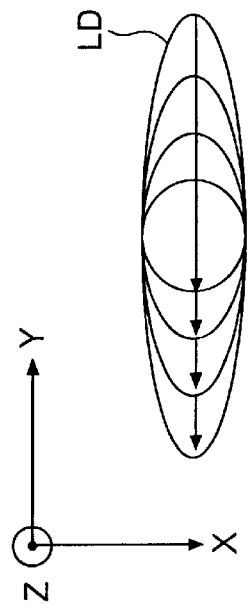
Figure 24C:
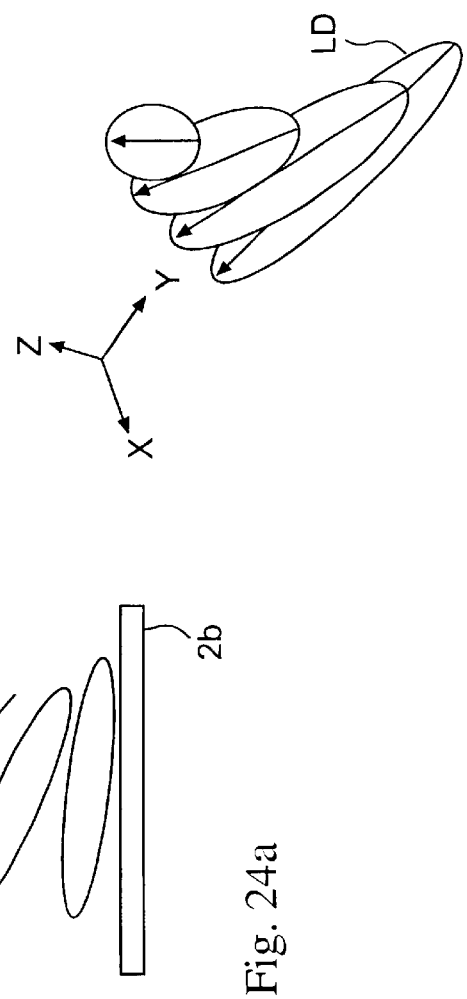
Figure 24A:
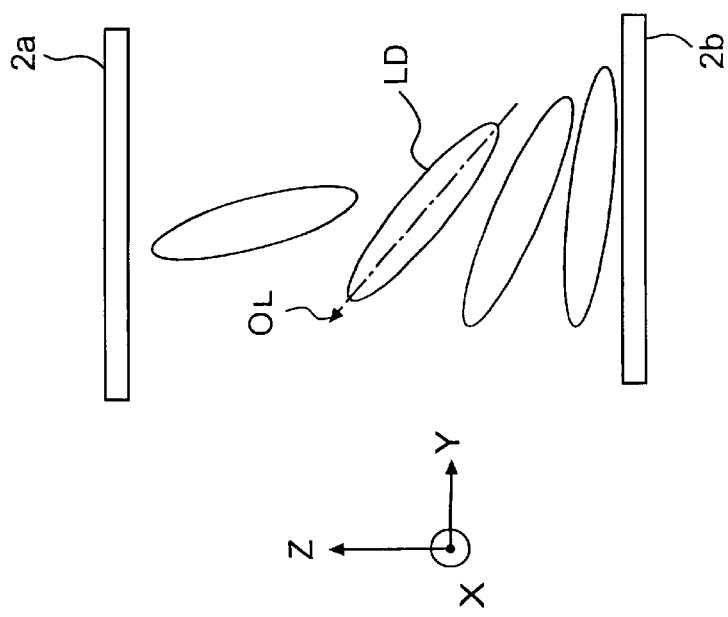

FIG. 22 represents a cross sectional view of a liquid crystal display device by this embodiment. FIG. 23 illustrates a diagram which explains the function of the device. The liquid crystal display device comprises two polarizers (LLC2-92-18: of Sanitize make) 1 and 4, between which are held the liquid crystal cells 2, 5, 6, 7 that are the optical anisotropic elements for compensation of viewing angle and the driving liquid crystal cell 3.

The liquid crystal cells for compensation of viewing angle used as the optical anisotropic elements 2 and 5 are provided between the polarizer 1 and the driving liquid crystal cell 3. The optical anisotropy of the optical anisotropic element is positive.

The liquid crystal cell structure has the liquid crystal 2c between the transparent substrates 2a and 2b. The substrate 2a undergoes vertical alignment (homeotropy) and substrate 2b, horizontal one. In the horizontal alignment of 2b, rubbing is performed on the aligned film to give about 2 degrees of tilted alignment. Used as the liquid crystal 2c is a positive anisotropic nematic liquid crystal (ZL1-4287, of E. Merck Co., Ltd. make) whose thickness is 1.9 micrometers and retardation (product of the optical anisotropy of liquid crystal and thickness of liquid crystal layer), 180 nm. The optical anisotropic element 7 (substrates 7a and 7b) is an anisotropically positive element identical with the optical anisotropic element 2 and aligned reversibly.

The optical anisotropic element 5 comprising the cell for compensation of viewing angle of negative anisotropy is of liquid crystal cell structure having the liquid crystal 5c between the transparent substrates 5a and 5b.

$SiO_2$ is oblique-vaporized at a certain angle on the surface of the transparent substrate 3b. Anisotropically negative discotic liquid crystal $[C_{18}H_6(OCOC_7H_{15})_6]$ with triphenylene core with alkyl chain by ester bond) is introduced as an optical anisotropic substance layer. The pretilt angle is 60 degrees if it is near to the driving liquid crystal cell 4 and 90 degrees if far from it. The retardation is −220 nm. The optical anisotropic element 6 (substrates 6a and 6b) consists of the anisotropically negative cell for compensation of viewing angle identical with that of the optical anisotropic element 5, and aligned in reverse.

The optical anisotropic elements 2 and 5, and optical anisotropic elements 6 and 7 make pairs respectively and so aligned that anisotropically negative elements do face the driving liquid crystal cell 3. Namely, the driving liquid crystal cell 3 is disposed between the anisotropically negative elements 5 and 6.

The driving liquid crystal cell 3 has a liquid crystal 3c which is held between the substrate 3a with a transparent electrode 3a1 formed on a color filter and the substrate 3c with a thin-film transistor and pixel electrode 3b1 formed on each picture element and forms 90-degree twisted alignment when no voltage is applied. Introduced into the liquid crystal 3c at 90-degree twist angle is the nematic liquid crystal (ZL1-4287, of E. Merck Co., Ltd. make) into which chiral agent S811 (Commercial name, of E. Merck Co., Ltd. make) is mingled. This liquid crystal alters its state in response to the voltage applied from the drive source 4E, which is a means to apply voltage. It maintains the twisted alignment if no voltage is applied.

The differential Δnd of the liquid crystal used for the driving liquid crystal cell 3 is 0.093 and the thickness of the liquid crystal layer is 5.0 micrometers. The liquid crystal molecule of the driving liquid crystal cell 3 is twisted counterclockwise (left twist) from the lower substrate 3b toward the upper substrate 3a. This cell 3 acts as TN cell with 90 degrees of twist angle and controls the light by optical rotatory power.

FIG. 26 is an explicative exploded view showing the configuration of the liquid crystal display device in this embodiment, where FIG. 26a is a perspective view, FIG. 26b top view, and FIG. 26c side view. (1.1) and (4.1) are the absorption axes of the polarizers 1 and 7, which run orthogonal to each other and (1.1) is arranged at 45 degrees counterclockwise as viewed, from the +Z direction which is the direction of the normal to the substrate, against the Y axis.

(3.1) and (3.2) are the rubbing axes of the upper substrate 3a and lower substrates 3b of the driving liquid crystal cell, namely, the direction of the alignment, which run orthogonal to each other, and the angle between the X axis and the rubbing axis (3.1) is arranged at 135 degrees counterclockwise as viewed from the +Z direction.

The anisotropically positive element 2 has the optical axes 20U of optical anisotropic units which are justified in one and same orientation and is tilt-aligned at about 2 degrees on the lower substrate as shown in the side view of FIG. 26c and at about 90 degrees on the upper substrate, being continuously tilted in between (hybrid alignment). The average of these optical anisotropic units, that is the average optical axis 20A is disposed at 225 degrees counterclockwise as viewed from the +Z direction against the X axis.

The anisotropically positive optical anisotropic element 7 provided on the other side of the liquid crystal cell 3 has the same configuration as the optical anisotropic element 2. The array of the element 7 is a vertically inverted (upside down)

array of the element 2 as viewed from the +Z axial direction and its average optical axis 60A is 135 degrees from the +Z axis to the X axis.

On the other hand, the optical axis 50U of the optical anisotropic units of optical anisotropic element 5 (the optical axis in this case being defined as the direction with the smallest refractive index) slants 90 degrees on the upper substrate and 60 degrees on the lower substrate as shown in FIG. 26, and the slant angle varies therebetween successively. Therefore, the average optical axis 50A tilts against the element face and its orientation is −45 degrees from X axis when viewed from the +Z axis.

The anisotropically negative optical anisotropic element 5 has also the same configuration as the optical anisotropic element 3. The array of the element 5 is a vertically inverted (upside down) array of the element 2 as viewed from the +Z axial direction and its average optical axis 60A is the average optical axis 20A which is 45 degrees separated from the +Z axis to the X axis.

Figure 27:
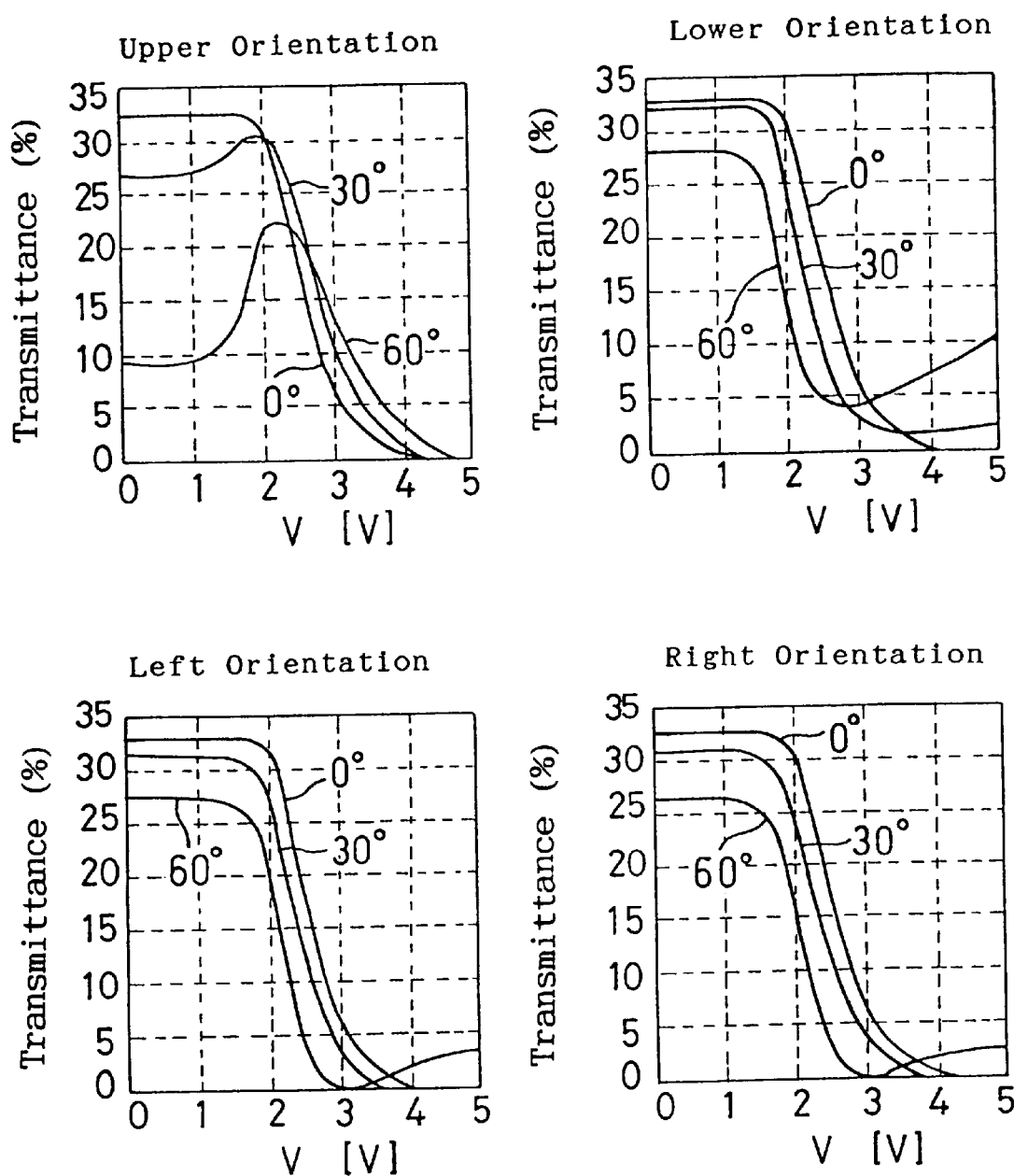
FIG. 27 contains graphs showing the electrooptic characteristic of the optical anisotropic element of embodiment 9.

The electrooptic characteristic of the liquid crystal display device by this configuration was measured on the coordinate system as shown in FIG. 2b, but changing the angle of the observation point, azimuth φ and viewing (visual) angle θ. The voltage at the measurement (voltage to be applied on the liquid crystal layer 4c of the driving liquid crystal cell 3 from the drive voltage 3E) was changed from 1 V to 5 V. FIG. 27 shows the results of this measurement. FIG. 27 indicates the applied voltage-transmittance characteristics in four orientations (upper/lower and right/left) except the reduction in transmittance by the color filter, showing thus the transmittance when the visual angle is changed by 30 degrees from 0 (front) to 60 degrees. The idealistic characteristic is that the transmission curve is the same at any angle with that at the front (visual angle θ=0).

Figure 28:
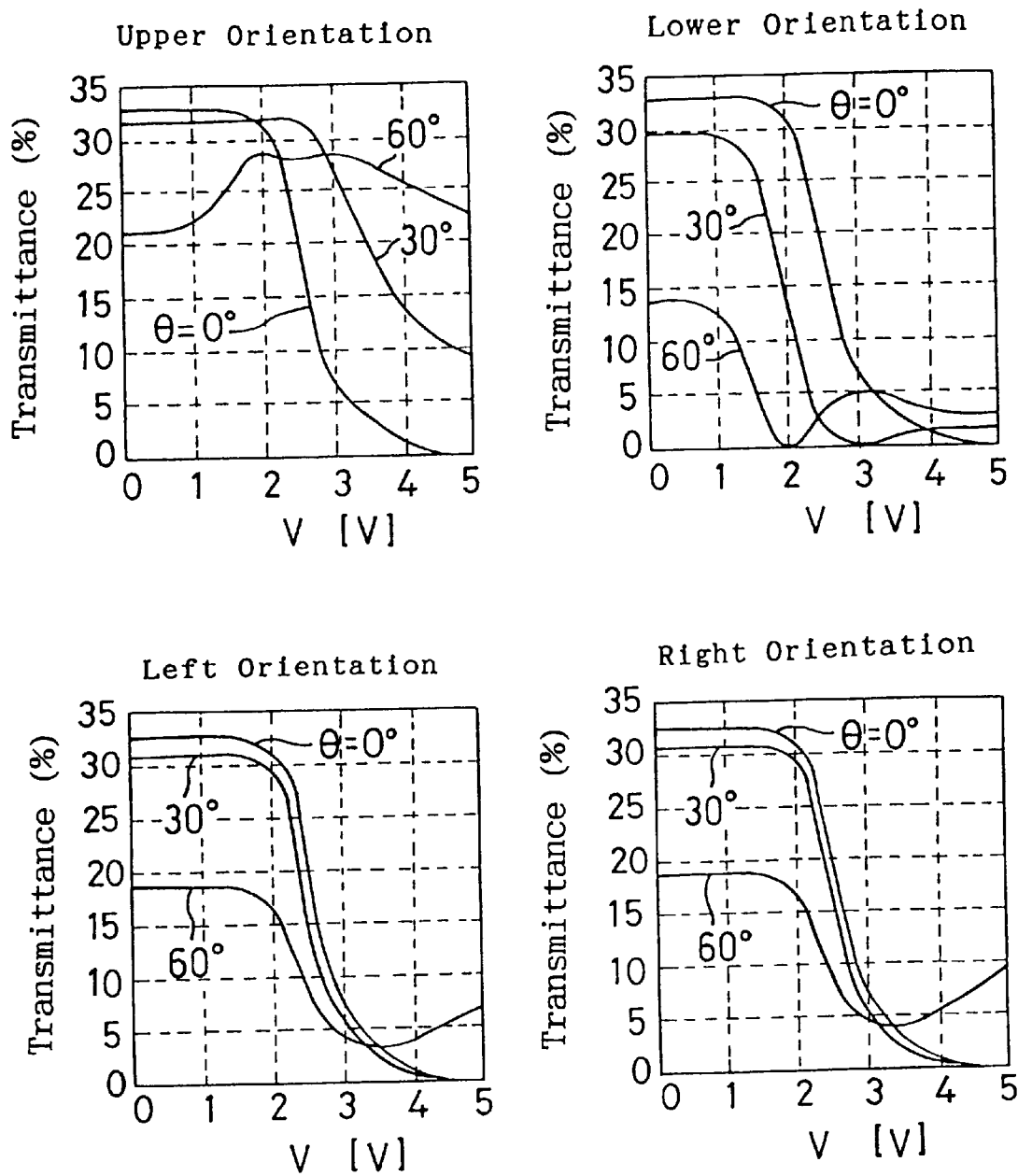
FIG. 28 contains graphs showing the electrooptic characteristic of the optical anisotropic element by prior art.

FIG. 28 shows the applied voltage-transmittance characteristic when any optical anisotropic element by conventional art is not used. The characteristic in the lower orientation is that the transmittance reduces as the visual angle grows larger. This means that the "excessive dark image" produces when the tonal display is practiced. The re-increase of the transmittance at 60 degrees of visual angle is equivalent to the "reversing" in the actual display. In the upper orientation, the transmittance increases as the visual angle at 3 V of voltage grows from 0 to 60 degrees. This is equivalent to the "excessive bright image" in the actual display.

In this embodiment, FIG. 27 manifests improved characteristic, in particular, the transmittance at 0 V and at slanted 60 degrees, exhibiting a higher value except in the upper orientation, which signifies that a bright display is possible even in the slanted direction.

An excellent display could be obtained even at larger angle when this liquid crystal display element 64 was displayed with 64 gradations.

COMPARISON EXAMPLE 2

Figure 29:
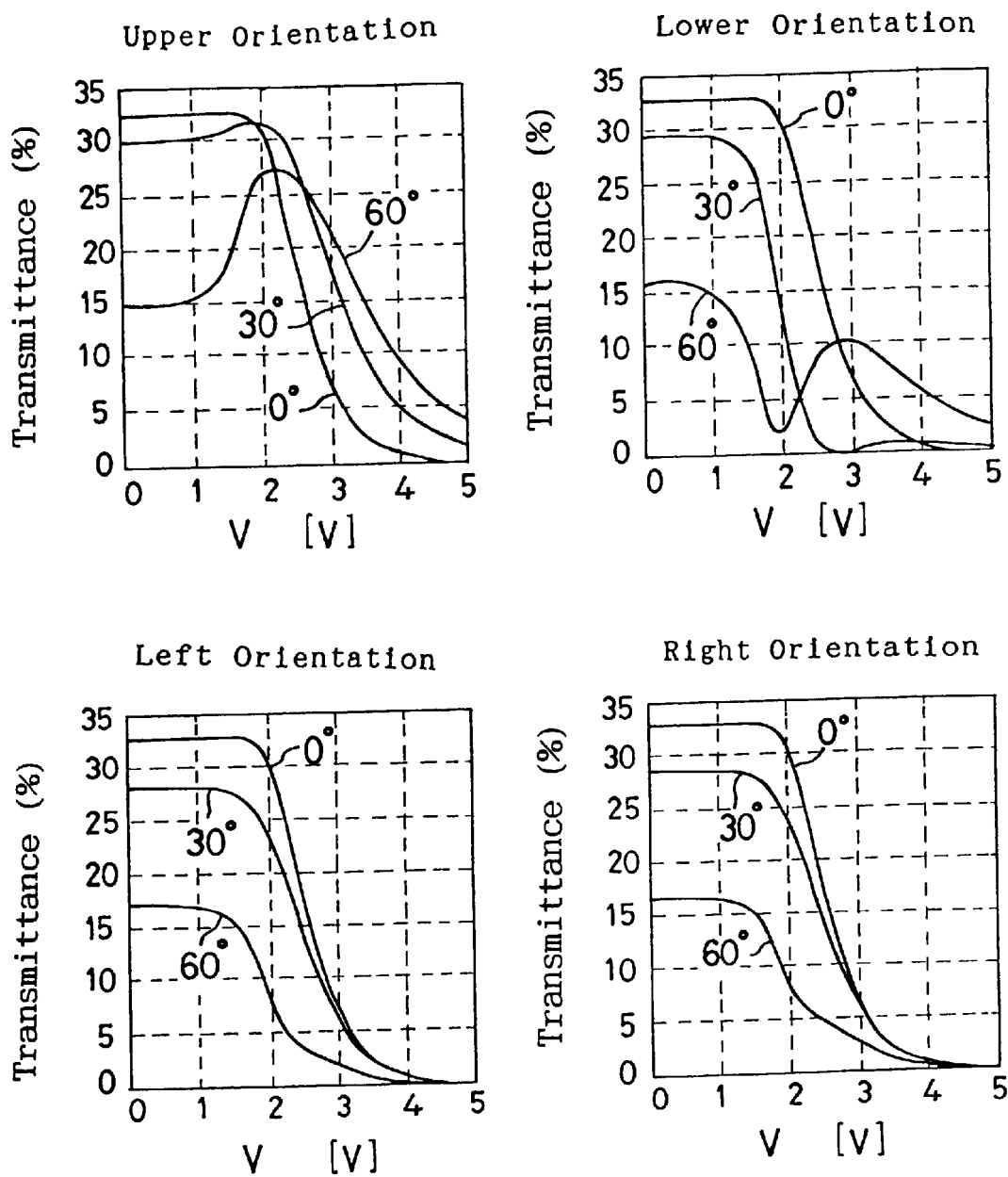
FIG. 29 contains graphs showing the electrooptic characteristic of the optical anisotropic element by comparative example 2.

The voltage-transmittance characteristic was measured in Embodiment 9 where there are anisotropically negative elements 3 and 5 only, without positive optical anisotropic elements 2 and 6. FIG. 29 shows the results of this measurement. In this comparative example, the characteristic in the lower orientation is improved more or less, but the transmittance is high and contrast low at 5 V in the right and left orientations.

COMPARISON EXAMPLE 3

Figure 30:
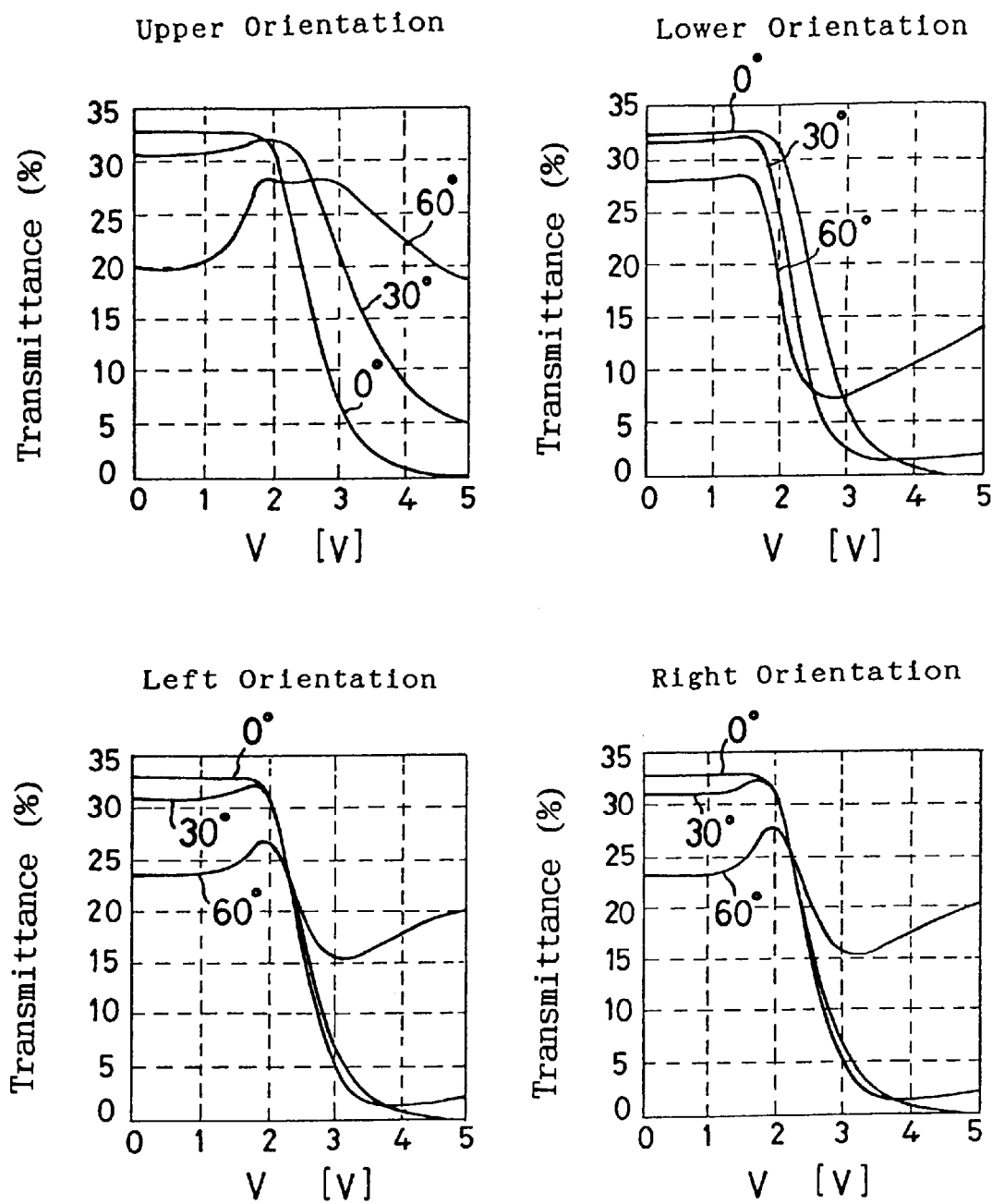
FIG. 30 contains graphs showing the electrooptic characteristic of the optical anisotropic element by comparative example 3.

The voltage-transmittance characteristic was measured in Embodiment 9 shown in FIG. 22, where there are anisotropically positive elements 2 and 7 only, without negative optical anisotropic elements 5 and 6. FIG. 30 shows the results of this measurement. In this comparative example, the transmission is restricted to low rate in the upper, right and left orientations, but the transmittance in the lower orientation is marked to be suddenly lowered, producing thus the reversing and excessive dark image.

EMBODIMENT 10

A biaxial phase difference film is provided between the driving liquid crystal cell 3 and the liquid crystal cell for compensation of viewing angle 2 which is the first optical anisotropic element in Embodiment 9 to compensate for the optical anisotropy with unstable discotic alignment. Though no remarkable improvement was given from characteristic viewpoint, irregular display due to poor alignment could be alleviated.

EMBODIMENT 11

Figure 31:
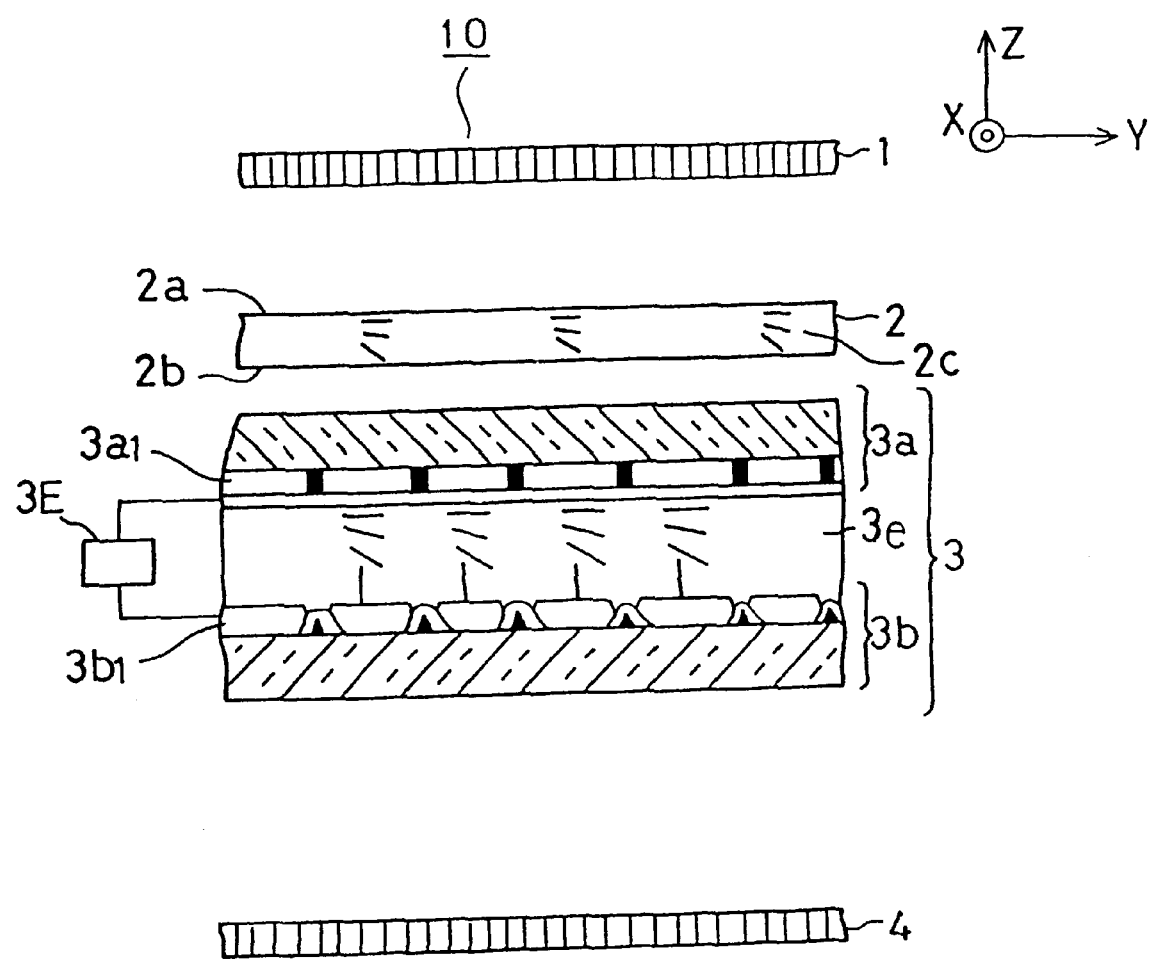
FIG. 31 is a cross sectional view showing the cross sectional view of the liquid crystal display device of embodiment 11.
Figure 32:
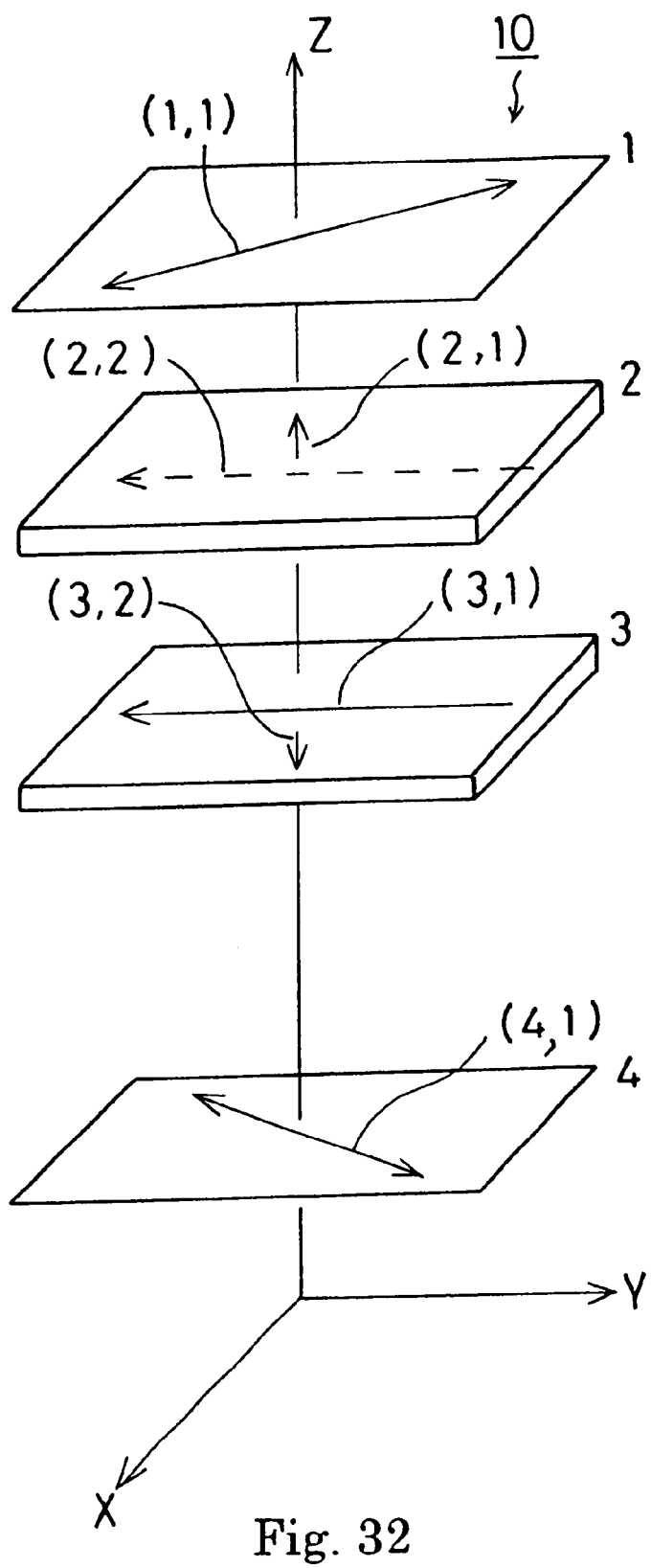
FIG. 32 is an exploded perspective view showing the configuration of the liquid crystal display device of embodiment 11.

FIGS. 31 and 32 show the liquid crystal display device of embodiment 11. The liquid crystal display device 10 comprises two polarizers (LLC2-92-18: of Sanitize make) 1 and 4, between which are held the liquid crystal cell which is the optical anisotropic elements for compensation of viewing angle 2 and the driving liquid crystal cell 3. The polarizers 1 and 4 have respectively a polarizing film held between their transparent substrates.

The liquid crystal cells for compensation of viewing angle 2 used as the optical anisotropic elements are provided between the polarizers 1 and 4.

The liquid crystal cell structure has the liquid crystal 2c between the transparent substrates 2a and 2b. $SiO_2$ is oblique-vaporized at different angles on the surface of the transparent substrate 2a and 2b. Anisotropically negative discotic liquid crystal [$C_{18}H_6(OCOC_7H_{15})_6$ with triphenylene core with alkyl chain by ester bond] is introduced between these substrates as an optical anisotropic substance layer. The pretilt angle (slant of the optical axis against the substrate face) is 30 degrees if it is near to the driving liquid crystal cell 3 and 90 degrees if is far from it. The effective Δnd of the optical anisotropic substance layer used in the liquid crystal cell for compensation of visual angle is −60 nm.

The driving liquid crystal cell 3 is provided between the polarizer 4 and the liquid crystal cell for compensation of visual angle 2. The two substrates, upper substrate 3a and lower substrate 3b, form respectively the transparent electrodes 3a1 and 3b1, which are connected to the drive source 3E. Charged between the substrates 3a and 3b is the nematic liquid crystal with dielectrically positive anisotropy (ZL1-4287, of E. Merck Co. Ltd. make), which changes its state depending on the voltage applied by the drive source 3E. It maintains the hybrid alignment when no voltage is applied.

The differential Δnd of the liquid crystal molecule of the driving liquid crystal cell 3 is 0.093 and the thickness of the liquid crystal layer is 5.0 micrometers. The liquid crystal molecule of the driving liquid crystal cell 3 is arrayed, changing its tilt angle from substantially vertically to horizontally, from the lower substrate 3b toward the upper substrate 3a, that is hybrid alignment.

FIG. 32 is an exploded perspective view showing the configuration of the liquid crystal display device in this embodiment.

(1.1) and (4.1) are the transmission axes of the polarizers 1 and 4, which run orthogonal to each other and (1.1) is arranged at 45 degrees counterclockwise as viewed from the +Z direction which is the direction of the normal to the substrate, against the Y axis. (3.1) is the rubbing axis of the upper substrate 3*a*, namely, the direction of the alignment, and the angle between the Y axis and the rubbing axis (3.1) is arranged at 135 degrees counterclockwise as viewed from the +Z direction. (3.2) is the alignment direction of the lower substrate 3*b*, which substantially coincides with the −Z direction.

The (2.1) and (2.2) of the liquid crystal cell for compensation of visual angle 2, which is an optical anisotropic element, are the alignment directions of the upper and lower substrates 2*a* and 2*b* respectively as shown in FIG. 1, and the liquid crystal cell for compensation of visual angle 2 is so arrayed that its alignment direction (2.2) runs parallel to the rubbing axis (3.1) of the driving liquid crystal cell 3.

The polarizer is so arranged that the transmission axis (1.1) makes an angle of 45 degrees with the rubbing axis (2.1) of the liquid crystal cell for compensation of visual angle 2.

Figure 34B:
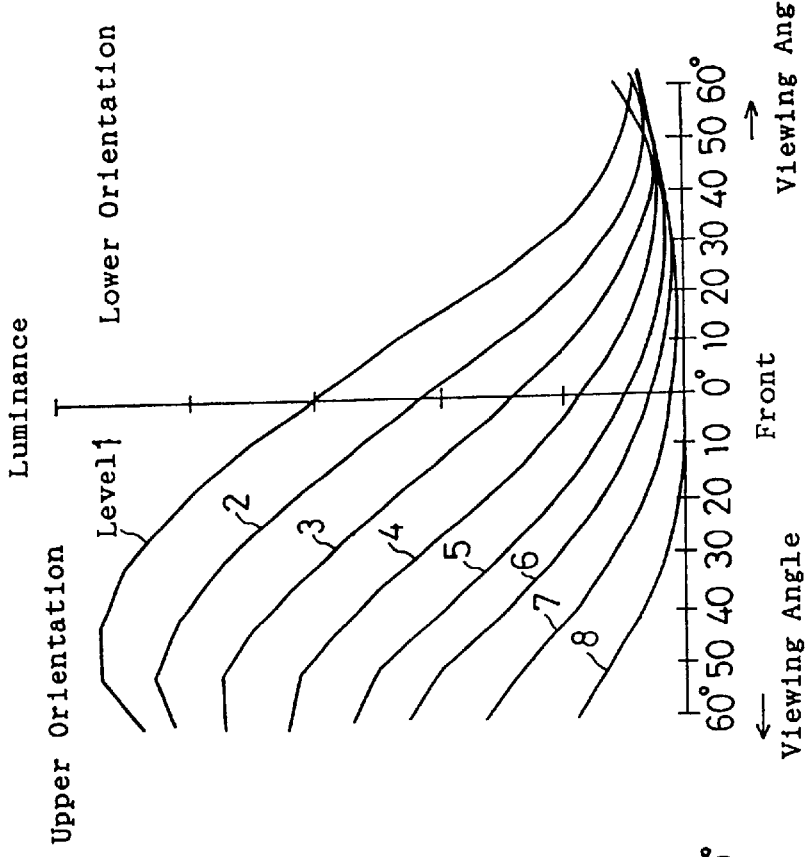
FIG. 34a and FIG. 34b are graphs showing the electrooptic characteristic of the liquid crystal display device of embodiment 11.
Figure 34A:
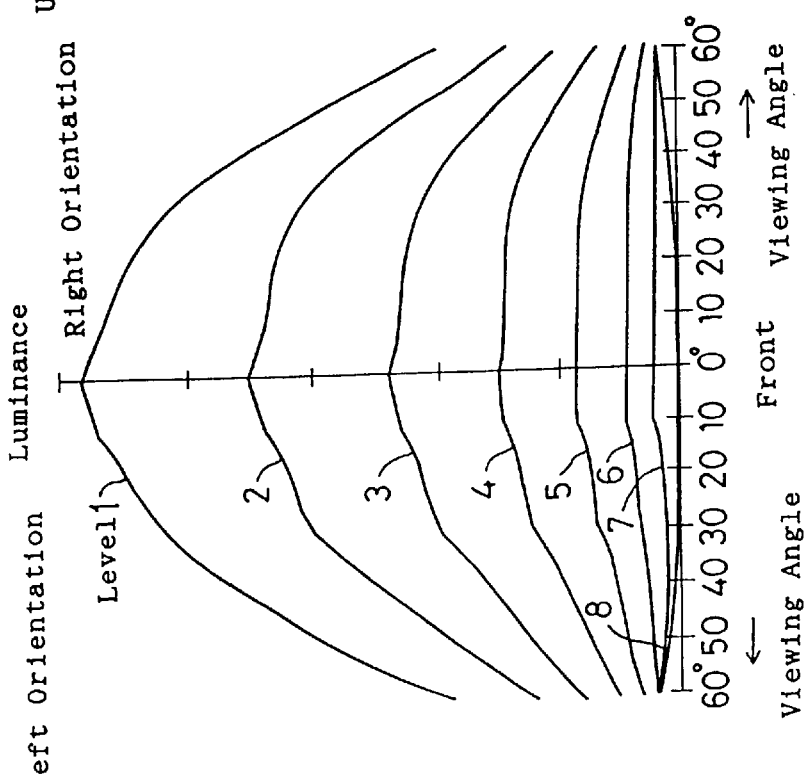

The electrooptic characteristic of the liquid crystal display device by this configuration was measured on the coordinate system as shown in FIG. 2(*b*). The voltage at the measurement (voltage to be applied on the electrodes 3*a*1 and 3*b*1 of the driving liquid crystal cell 3 from the drive voltage 3E) was changed from 0 V to 5 V. FIG. 34 shows the results of this measurement. FIG. 34 indicates the visual angle-luminance characteristic for upper/lower and right/left gradations showing the respective gradations and luminance when the visual angle is changed by 10 degrees from the front (0) to 60 degrees. The idealistic characteristic is that the transmission curve is the same at any angle with that at the front (visual angle θ=0).

As is understood from FIG. 34, in this embodiment the reversing is further reduced than TN in any of upper/lower and right/left orientations. Since the transmittance of black color hardly increases, an excellent contrast with larger visual angle can be obtained.

This invention is also useful when only such particular angle is to be changed under special conditions as in the car navigation system.

Though this specification mentioned only TN type liquid crystal display device using TFT, it is needless to say that excellent effects can be obtained if it is applied to such a simple matrix liquid crystal display device as STN.

What is claimed is:

1. A liquid crystal device comprising:

a polarizer;

a driving liquid crystal cell having two substrates and a liquid crystal layer held between the two substrates; and an optical anisotropic element having a first surface close to the driving liquid crystal cell and a second surface close to the polarizer, the optical anisotropic element being interposed between the polarizer and the driving liquid crystal cell, wherein the optical anisotropic element comprises a plurality of optical anisotropic units with negative optical anisotropy, each of said plurality of optical anisotropic units having an optical axis, and wherein an angle of the optical axis of each of said plurality of optical anisotropic units with respect to the first and second surfaces being varied continuously in a direction of thickness with respect to an intermediate reference plane, the intermediate reference plane being between the first and second surfaces, the optical axis of the optical anisotropic unit close to the first surface being substantially parallel to the optical axis of the optical anisotropic unit close to the second surface.

2. A liquid crystal display device as claimed in claim 1, wherein the directions of the optical axes of the optical anisotropic units reside along a single axis when viewed from the direction of the normal to the substrate of the driving liquid crystal cell.

3. A liquid crystal display device as claimed in claim 1, wherein the optical axes of the optical anisotropic units have at least two directions when viewed from the direction of the normal to the substrate of the driving liquid crystal cell.

4. The liquid crystal display device as claimed in claim 1, wherein the optical axes of the optical anisotropic units are twisted continuously or stepwise.

5. The liquid crystal display device as claimed in claim 1, wherein a biaxial retardation film is disposed between the polarizer and the optical anisotropic element.

6. The liquid crystal display device as claimed in claim 1, wherein an optical anisotropic substance of the optical anisotropic element is selected from a group consisting of organic material, inorganic material and high molecular liquid crystal.

7. An optical anisotropic element forming a first surface and a second surface, comprising:

a plurality of optical anisotropic units with negative optical anisotropy, each of said plurality of optical anisotropic units having an optic-axis, wherein said plurality of optical anisotropic units define a plurality of optic-axis angles with respect to the first surface and second surface, wherein an angle of the optical axis of each of said plurality of optical anisotropic units with respect to the first and second surfaces being varied continuously in a direction of thickness with respect to an intermediate reference plane, the intermediate reference plane being between the first and second surfaces, the optical axis of the optical anisotropic unit close to the first surface being substantially parallel to the optical axis of the optical anisotropic unit close to the second surface.

8. The optical anisotropic element as claimed in claim 7, wherein the respective optical axes of the optical anisotropic units are aligned along a single axis when viewed from the direction of the normal to the surface of the optical anisotropic element.

* * * * *

UNITED STATES PATENT AND TRADEMARK OFFICE
CERTIFICATE OF CORRECTION

PATENT NO. : 6.411.355 B1
DATED : June 25, 2002
INVENTOR(S) : Manabe et al.

It is certified that error appears in the above-identified patent and that said Letters Patent is hereby corrected as shown below:

<u>Title page,</u>
Item [73], Assignee should read -- Kabushiki Kaisha Toshiba
Kanagawa-ken, Japan --

Signed and Sealed this

First Day of October, 2002

Attest:

JAMES E. ROGAN
Attesting Officer        Director of the United States Patent and Trademark Office